(12) United States Patent
Shukoor

(10) Patent No.: US 8,108,241 B2
(45) Date of Patent: Jan. 31, 2012

(54) SYSTEM AND METHOD FOR PROMOTING ACTION ON VISUALIZED CHANGES TO INFORMATION

(76) Inventor: Shabina Shukoor, New York, NY (US)

( * ) Notice: Subject to any disclaimer, the term of this patent is extended or adjusted under 35 U.S.C. 154(b) by 823 days.

(21) Appl. No.: 11/785,736

(22) Filed: Apr. 19, 2007

(65) Prior Publication Data

US 2008/0033777 A1 Feb. 7, 2008

Related U.S. Application Data

(63) Continuation-in-part of application No. 10/194,031, filed on Jul. 11, 2002, now abandoned.

(60) Provisional application No. 60/304,679, filed on Jul. 11, 2001.

(51) Int. Cl.
*G06Q 10/00* (2006.01)
(52) U.S. Cl. ........................ 705/7.27; 705/7.38
(58) Field of Classification Search ............... 705/7.27, 705/7.38
See application file for complete search history.

(56) References Cited

U.S. PATENT DOCUMENTS

| | | | | |
|---|---|---|---|---|
| 5,835,094 | A * | 11/1998 | Ermel et al. | 715/848 |
| 6,366,299 | B1 * | 4/2002 | Lanning et al. | 715/738 |
| 6,775,659 | B2 * | 8/2004 | Clifton-Bligh | 1/1 |
| 6,976,212 | B2 * | 12/2005 | Newman et al. | 715/227 |
| 7,076,742 | B1 * | 7/2006 | Thorn et al. | 715/853 |
| 7,509,591 | B1 * | 3/2009 | Thorn et al. | 715/853 |
| 2007/0132767 | A1 * | 6/2007 | Wright et al. | 345/475 |
| 2007/0171716 | A1 * | 7/2007 | Wright et al. | 365/185.12 |

OTHER PUBLICATIONS

Robertson et al., Cone Trees: Animated 3D Visualizations of Hierarchical Information, 1991, p. 1-10.*
Ammoura, DIVE-ON: From Databases to Virtual Reality, Crossroads, vol. 7, Issue 3 (Spring 2001), p. 1-15.*
Wilson et al., Emerging Tools for Information Visualization, IT Pro, Nov./Dec. 2000, p. 14-21.*
Robertson et al., Information Visualization using 3D Interactive Animation, Comunications of the ACM, vol. 36, No. 4, Apr. 1993, p. 57-71.*
Kosara, Metaphors of Movement—A User Interface for Manipulating Time-Oriented, Skeletal Plans, May 6, 1999, p. 1-66.*
Songer et al., Multi-Dimensional Visualization of Project Control Data, 2004, p. 1-25.*
Liechti et al., The SGF Metadata Framework and its Support for Social Awareness on the World Wide Web, Information System Laboratory, Faculty of Engineering, Hiroshima Univ., 1999, p. 1-29.*
The Evolving Art of Visual Data Representation, A White Paper for Producers and Analysts of Complex Data, High Tower Software, p. 1-14, 1999.*

(Continued)

*Primary Examiner* — Justin M Pats

(57) ABSTRACT

An improved method is provided herein of managing information that typically relates to a project, process, or workflow. The information is classified within various hierarchical levels of categories, subcategories and their lowest level data elements and is organized within an electronic graph in a corresponding hierarchical sequence. The graph comprises what is termed as "cell bodies" in the form of graphical objects. These graphical objects represent each of the categories, subcategories and data elements and are aligned against each other in various orthogonally stacked configurations where the cell bodies consist of one or more geometric shapes, symbols, characters and their respective features such as color, in a tight grouping, which together, represent several variables of a single data set record. Each cell body may be a cluster of one or more such graphical components.

24 Claims, 33 Drawing Sheets

OTHER PUBLICATIONS

Schneiderman, Treemaps for space-constrained visualization of hierarchies (A History of Treemaps), University of Maryland, p. 1-13, Started Dec 26, 1998, p. 1-13.*

Sifer and Liechti, Zooming in One Dimension can be better than Two: an Interface for Placing Search Results in Context with a Restricted Sitemap, Proceedings of the IEEE Symposium on Visual Languages, 1999, p. 1-8.*

* cited by examiner

SYSTEM AND METHOD FOR PROMOTING ACTION ON VISUALIZED CHANGES TO INFORMATION

CONTINUING DATA

This invention is a continuation-in-part of pending U.S. patent application Ser. No. 10/194,031, filed Jul. 11, 2002 now abandoned, published Jan. 16, 2003 as Publication No. US 2003/0014409 A1, that application claiming priority from provisional application No. 60/304,679, filed Jul. 11, 2001.

BACKGROUND OF THE INVENTION

1. Field of the Invention

The present invention relates to the fields of data visualization for business intelligence and decision support as it applies preferably (but not solely) to workflow and project management. The invention also relates to the field of graphical user interface design with associated methods for the interactive manipulation and updating of information stored in computer file storage and database systems. The present further invention relates to the field of information management, typically to the management of projects, workflows or processes that can be divided into a plurality of tasks or any informational items having changeable categorical classifications that can be tracked, and more specifically to a method and system for representations of projects, processes or workflows divided into data items having updateable categorical classifications where changes may be updated or visually tracked by means of an electronic graphing system.

2. Description of the Prior Art

As business processes increase in complexity, it becomes necessary to determine systems and methods for managing the associated information. In particular, processes can be divided into a plurality of different tasks or actionable items, each of which have a status that ranges from "un-started" to "completed". Adding to the complexity of the situation is the need to manage people and other resources and to determine where there are weaknesses and overtaxed resources. Accordingly, it is critically important to manage projects and resources and to optimize the equation to increase performance.

The complex data management challenge is the organizing, prioritizing and real-time communicating of information which is now becoming a growing burden. The complexity of data organization is further complicated when process tasks are fluid, unstructured, collaborative, interdependent and frequently changing. For example there are a number of attempts to provide simple easy-to-use intelligent structures for efficiently managing the following typical types of task data: ad-hoc tasks, namely unstructured work have no easy-to-use personalized organization system, since such system tends to morph into user-created spreadsheet-driven solutions; spreadsheets which become cumbersome for the person maintaining them, as the record sets expand and as processes requires real-time sharing, updating rules or collaboration; e-mails with unstructured follow-up processes which provide an unpredictable workload and, in general causes considerable productivity time losses from focus-switching interruptions; and e-mails which often convert into unstructured follow-up tasks that become cumbersome to track, search and prioritize; project data and risks including planned project tasks, issues and risks frequently change status, content, priority or assignment and which require frequent re-documentation, re-summarizing and re-communicating in PowerPoint presentations, e-mails and text documents.

Traditional schemata for preparing and analyzing workflow utilize the familiar "tree" diagram wherein regional locations are broken into departments, projects, phases and tasks, in downward progression. For example in the prior art, a fictional company may be divided into three region categories. Below the region categories may be the first level "branches" of the tree. Below the departments there may be project categories. On the next level below the departments there may be phase categories 8, which are the same in number as each of the project categories. Tasks may then be shown below for each phase and there may be connectivity between the various levels of the tree.

This traditional organizational chart of the prior art as described above has a number of drawbacks. In the first place, there is a large amount of wasted space on the page. Additionally, while connectivity may be provided, the status of the projects is not available, Perhaps the most important aspect of management, would require a hyperlink of some kind in order to be rendered visible, thereby taking the task to another page, and, at that point, failing to maintain a consistent visual representation of connectivity to the remainder of the tasks, phases, projects, departments and regions. The user must return from the hyperlink, and this added step creates a confusing management tool to the end user. Indeed, one could well imagine a large organization being unable to even represent the entirety of the organization on one page if the traditional organizational chart of the prior art is used, since the wasted space is unavailable.

Known prior art that incorporates the dual function of visualization and drag/drop data update via graphical objects, is that of the system known as a "Gantt Chart", as utilized in several project management applications, e.g., that known by the name of "Microsoft Project". A typical "Gantt Chart" shows graphical horizontal "bars" that represent an individual task, where the width of the bar starts and finishes across a range of calendar time shown on the top horizontal axis.

As a task visualization tool, "Gantt Charts" are best used for visualizing the overall structure, overlapping timelines and dependencies of a project plan as a whole. However, the "Gantt Chart" is not practical for the targeted "at-glance" lookup of specific information for a given task, because the graphics are inconveniently spread out. For example, a one hundred and twenty task project over a three month duration prints over twelve pages, in which, moreover, the resulting visual is mostly blank space. Clearly, a visualization mode that is mostly "blank space" and requires the user to scroll across three or more pages, just to look up one piece of information, is highly inefficient and impractical.

Another defect of the "Gantt Chart" is that, while a "Gantt Chart" may be initially setup and visually inspected at the start of a project, once the project is underway, sorting and searching is through associated task tables, and not through "Gantt Charts", for the quick, day-to-day lookup and updating of task information.

Moreover, as a graphical user interface for drag/drop data updates, the "Gantt Chart" is very limited. For example, in "Microsoft Project", the user can drag/drop update % completion bars, exact start dates, exact finish dates and predecessor/successor linkages. No other project data can be updated within the current "Gantt Chart" structure purely by drag/drop capability. Hence, additional important project data, e.g., resource name, priority or status, must be updated in tables or in pop-up forms, since such data types are not represented by any equivalent "visual structures" (e.g., task bars or horizontal timelines) within the prior art "Gantt Chart" structure.

Another prior art example that combines task data visualization and drag/drop data updates, is the commonly used design for task objects within a calendar and/or timetable schedule known as a "graphical calendar". This system allows graphical objects representing tasks or reminders to be drag/dropped for the assignment of day, month and/or daily time slots that have fixed positions.

As a task visualization tool, the graphical calendar is impractical, because it would require searching through several pages to visualize tasks across three or four time periods. Similarly to the "Gantt Chart", there are wasted blank spaces for all the time or date areas where no tasks have been assigned. Scrolling across several pages to locate a few tasks spread across a few months is not an efficient or practical visualization method. Again, for quick lookup purposes, such information would more quickly be located by searching or sorting through a related task table, rather than the graphical calendars.

Another inconvenience of the graphical calendar as a task visualization tool is that it is impractical to squeeze in one hundred to two hundred or more task objects with a single timeslot on the same day, or even within the same day. The graphical calendar is thus more appropriate for individuals with no more than three or four tasks due in a given timeslot.

As a drag/drop data update tool, the graphical calendar has very limited functionality. The information that is commonly updated for the current known designs for graphical calendars is start/finish times, days, and/or reminder times. Like the "Gantt Chart", the existing graphical calendar structure does not incorporate visual objects representing data types other than start/finish, so any other task data must be updated within a pop-up form, or a task data table, but not by drag/drop capability.

Still another prior art example that is currently utilized for data visualization, but not for drag/drop data updating, is that of the structure known as a "TreeMap". "TreeMap" visualization, is described by B. Johnson and B. Schneiderman. in the paper "*TreeMaps: A Space-Filling Approach to the Visualization of Hierarchic Information Structures,*" *Proceedings of* 1991 *IEEE Visualization Conference*, and focuses on avoiding waste of space for trees whose interior nodes function as organizers or containers, mapping the tree into a nested rectangular structure, with the rectangles sized proportionately to the size of the nodes they contain, or other distinguishing principle. The most commonly used embodiment of "TreeMaps" is the grouping of hierarchical stock market data within industry sectors. The sizing and colors of boxes representing stock market trades represent relative market size and other features.

The current state of "TreeMap" technology focuses on visualization alone. There have been no known attempts to popularize a systematic "TreeMap" design methodology that is specifically set up for the purpose of "drag/dropping" or "auto-migration" of tree leaf boxes from one category to another. Several patents have issued allegedly improving on Shneiderman's existing "TreeMap" concept, but such patents have all focused on the sole purpose of visualization of data within mutually exclusive hierarchical groupings.

The prior art "TreeMap" data visualizations do not provide any systematic method of structuring data to enable drag/drop or migration of data from one tree leaf category to another. There is no suggestion in the "TreeMap" to derive rules, systems and methods and business reasons for the successful and systematic application of data migration and drag/dropping within and between areas of data on a "TreeMap".

The current known state of the art in "TreeMap" systems groups data in mutually exclusive categories, between which there is typically never any migration and correspondingly no teaching of creating a drag/drop human computer interface to perform such re-categorizations of data.

The very configuration of most "TreeMap" preferred embodiments currently in use are also not physically arranged easily to enable the drag/dropping activity of data between areas.

It is believed that the most advanced human computer interface research and designs in the use of "TreeMaps" for data visualization did not provide "drag and drop for data migration across a "TreeMap" as a systematic, known methodology and use of "TreeMaps". The prior art is focused only on visualization, and interactive manipulation of the "TreeMaps" but only for the provision of zooming, filtering and honing in on more visualization, but not on data updates.

It is therefore clear that proposed improvements on "TreeMaps" is purely focused on visualization and visualization alone as a purpose for TreeMap technology, and not for data manipulation and updating.

Yet another prior art example is to incorporate the dual function of visualization and drag/drop data update, which is typically applied in the area of software and project life cycle management where "drag/dropping" of documents, software code, or tasks is allowed between different nodes of a tree diagram. This may be in the form of "TreeMaps" and corresponding parent/child nodes and elements which are visually organized and structured within the frequently applied graphical "file folders" structure.

The weakness in this prior art method of drag/dropping within a "Tree-Map" is that once again, the visual structure is inconvenient for a large number of tasks that exceed the allotted number of available rows on a normal computer screen and thus would require excessive vertical scrolling or dragging across large areas to move an element from its source folder to the newly assigned destination folder or group.

Still another prior art technique was suggested by the leading Human Computer Interface research group, namely University of Maryland, Human Computer Interaction Laboratory. They reported that they believed that the future of user interfaces was in the direction of larger, information-abundant displays. With such designs, it was suggested that the worrisome flood of information can be turned into a productive river of knowledge. Their experience during the past eight years has been that visual query formulation and visual display of results can be combined with the successful strategies of direct manipulation. Human perceptual skills are quite remarkable and largely underutilized in current information and computing systems. Based on such insight, they developed dynamic queries, "Starfield" displays, "TreeMaps", "Treebrowsers" Zoomable user interfaces, and a variety of widgets to present, search, browse, filter, and compare rich information spaces. They suggested that there were many visual alternatives but that the basic principle for browsing and searching might be summarized as the "Visual Information Seeking Mantra": overview first, zoom and filter then details-on-demand. They rediscovered this principle and therefore wrote it down and highlighted it as a continuing reminder. They suggested that if they could design systems with effective visual displays, direct manipulation interfaces, and dynamic queries then users will be able responsibly and confidently to take on even more ambitious tasks Thus "Overview, Zoom, Filter, Details on Demand" is the "Visual Information Seeking Mantra" utilized by one of the world's leading institutions in "TreeMap" human computer interface research. Nowhere in this methodology is there any suggestion of drag/drop user interface activity for the purpose of data manipulation and direct human changes to the database data through interactive activity.

A system and method of visualizing and updating information in the form of what is known as "task cells" is taught in applicant's aforementioned pending U.S. patent application Ser. No. 10/194,031, filed Jul. 11, 2002, published Jan. 16, 2003 as Publication No. US 2003/0014409 A1, that application claiming priority from provisional application No. 60/304,679, filed Jul. 11, 2001. These "task cells" are geometric shapes which are stacked in a prioritized sequence within a hierarchical grouping of categories and sub-categories on an electronic spreadsheet.

That system and method of visualizing and updating information in the form of "task cells" on an electronic spreadsheet has the distinct advantage that information of all types, in the form of these "task cells" on an electronic spreadsheet can be arranged, sequenced and visually encoded within categorized stacks, in ways that demonstrate patterns, trends, potential bottlenecks and priorities. Such information within these "task cells" on an electronic spreadsheet is also encapsulated so that it can be physically manipulated as objects on the electronic spreadsheet viewed on a computer monitor through either a human-executed or system-auto-executed "drag-drop" mechanism, that repositions and re-stacks a selected task cell into a new category. Following this "drag-drop" mechanism on the front end, a computer system is programmed automatically to update the related back end record data and to "rearrange" the stacks, to position the dragged/dropped task cell icon into its new stack, and to tighten the previous stack to fill the gap of the removed, migrated task cell icon.

The invention in its general form will first be described, and then its implementation in terms of specific embodiments will be detailed with reference to the drawings following hereafter. These embodiments are intended to demonstrate the principle of the invention, and the manner of its implementation. The invention in its broadest sense and more specific forms will then be further described, and defined, in each of the individual claims which conclude this Specification

SUMMARY OF THE INVENTION

Aims of the Invention

It would be desirable to provide for the stacking of a plurality of data task cells in a single category so that the maximum available plotting area of most computer monitors would be not be exceeded.

It would also be desirable to provide for the stacking of a large plurality of data task cells in a single category where the user would not have to scroll vertically and/or horizontally to visualize the data task cells that would normally run off the page.

It would also be desirable to provide for the stacking of a large plurality of data task cells in a single category where the appearance of the data task cell represents not only a limited number of database parameters, e.g., color, pattern, relative task cell sequencing and position and contained text or symbols in a visual representation but also provides additional dimensions after the various visual components of a single data task cell (representing a single data element) have been exhausted.

It would also be desirable to provide a more compact, convenient method for grouping a larger number of data cell elements for more convenient drag/drop updating and re-categorizing of data.

It would also be desirable to provide a system and a method which not only provides visualization, but also provides drag/drop methodology.

Thus the present invention aims to provide a system and method for visually presenting an organization by way of categories, super-tasks, tasks and subtasks (defined to include all relevant organizational structural elements) without wasted space on the page, and with status information indicated for the subtasks in a simple, easily navigable, and reverse hierarchical manner.

The present invention also aims to enable a single layer visual representation on an electronics graph-like manner for each of the categories, the graph comprising orthogonally stacked data cells comprising graphical objects that consists of one or more geometric shapes in a tight grouping, which together, represent several variables of a single data element, wherein each data cell may be a cluster of one or more graphical objects, such electronics graph-like manner being of an entire organization and the status of its functions, with other organizationally significant functions rendered available, including data manipulation, forecasting, modifying of business processes, reporting, budgeting, and the like.

The present invention also aims to provide orthogonal electronics graph-like manner for each of the categories, the graph comprising orthogonally stacked data cells comprising graphical objects that consists of one or more geometric shapes in a tight grouping, which together, represent several variables of a single data element, e.g., a "bottom up", a "top down" or a "sideways" such graph modeling system with sub-tasks representing the one visual level, and broad categories representing orthogonally-stacked visual levels or with sub-tasks representing other orthogonally-stacked visual levels, and broad categories representing the other orthogonally-stacked visual levels.

The present invention also aims to provide an easy-to-learn visual language which is intuitive and can be personalized and that allows a user to perform the following: tasks, namely: quickly grasp hundreds of "to-do's" ad-hoc tasks and e-mail follow-ups without missing anything; communicate and real-time up-date of a plurality of project risks, tasks and issues in one view, at a single glance; eliminate many of the repeat text documentation, clicking, searching, sorting and reporting which is normally required to answer the most frequently asked questions about day-to-day project work; and make meetings and teamwork significantly more efficient by communicating key information with visuals instead of words, up-dating data on-the-fly and keeping all team members on the same page.

The present invention also aims to provide intelligent intuitive interactive visuals that allow the efficient management of "n"-dimensional business process data that is fluid complex and frequently changing for the multi-tasking knowledge professional.

Statement of Invention

The fundamental difference over the prior art is that the present invention in its various aspects and variants encompasses a methodology for drag/drop capability for direct data update, which, prior to this time, has never been conceived of.

The present invention, to be described herein, incorporates specific and unique methods and systems that enable drag/drop data manipulation within basic categorization structures, which may be applied to any structure that is designed with a specific set of rules.

The invention in one aspect thereof consists of a system and method for visually organizing, prioritizing and updating information on an electronic spreadsheet displayed on a computer monitor, electronic whiteboard, or other physical interface. The visualization method groups data elements in two or more categories and optionally one or more subcategories. The data elements are represented as graphical objects heretofore referred to as "Task Cells". The present invention, to be described herein, incorporates a specific and unique method and system that enables drag/drop data manipulation within basic categorization structures, which may be applied to a variety of structures that are designed with a specific set of rules.

By a broad aspect of the present invention, an improved method is provided herein of workflow management. In this method, the workflow is partitioned into categories, super-tasks, tasks and subtasks. In this method also the workflow data is organized in a corresponding hierarchical order. In the method of the present invention, the hierarchical order is inverted and the subtasks each have a status thereof which is determined from at least two possible statuses. In the method of the present invention also, the subtasks and their associated statuses are organized in an electronics graph-like manner for each of the categories, the graph comprising orthogonally stacked data cells comprising graphical objects that consists of one or more geometric shapes in a tight grouping, which together, represent several variables of a single data element, wherein each data cell may be a cluster of one or more graphical objects.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention Features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the accompanying drawings, wherein similar reference characters denote similar elements through the several views:

FIG. 3 is a visual representation of a second phase of the instant invention showing spatial compression and contained stacking and ordering in accordance with the present invention;

FIG. 4 is a visual representation of a third phase of the instant invention showing demarcations between regions, departments, projects, and phases, in accordance with the present invention;

DESCRIPTION OF PREFERRED EMBODIMENTS

Figure 1:
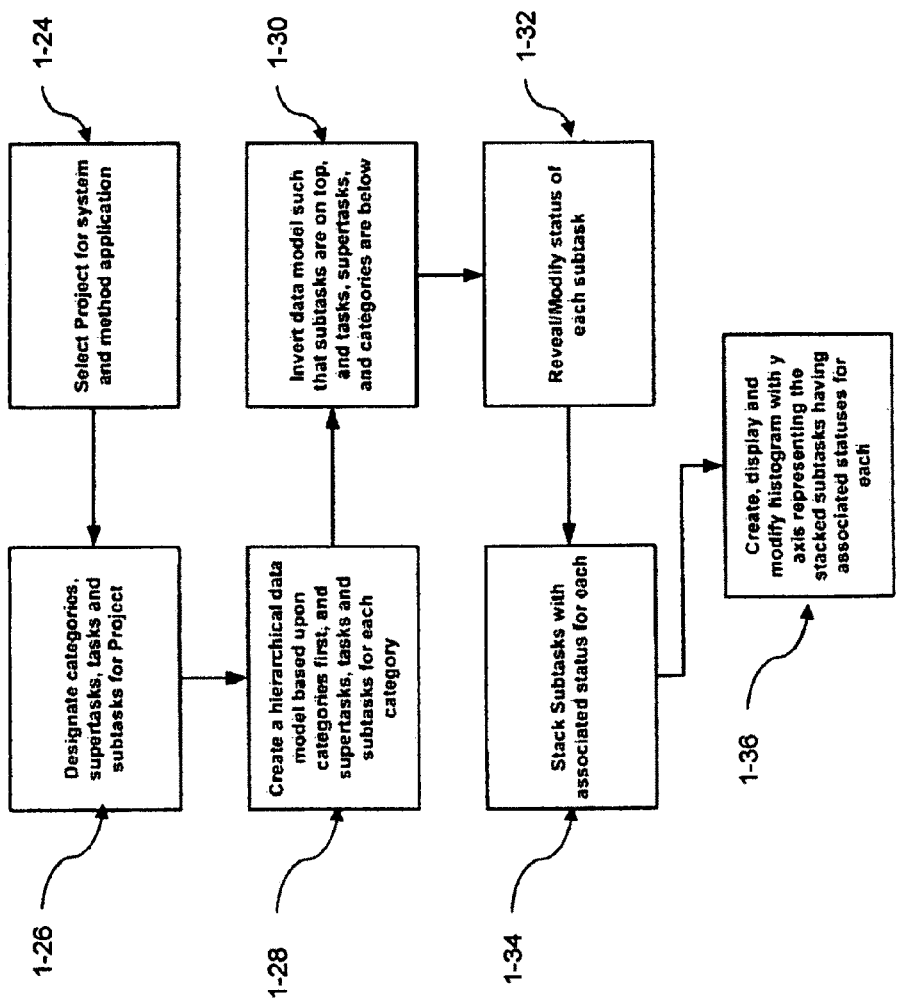
FIG. 1 is an overall system design of the method and system of the present invention.

Before describing preferred embodiments of the present invention, it is desired to provide some definitions of terms which will be used in the present specification and claims. These definitions are as follows:

STACKED CELL GRAPH: This represents the physical embodiment of the current invention, heretofore referred to as the "graph", that represents a novel method of visually organizing and prioritizing information in the form of physical or graphical objects. The objects are plotted in vertical or horizontal stacks according to specific sequencing and categorization rules. The graph may be "interactive", meaning that a human being can physically manipulate objects plotted on the graph. While the graph may consist of physical objects like blocks and magnets on a board, the preferred embodiment is a graph generated by a computer program and displayed on a screen (computer screen, electronic whiteboard, handheld screen or other), the objects being graphical and the human being can therefore pass a computer mouse pointer or other object over the graph and its objects to perform various functions related to them.

STACKED CELL GRAPHING SYSTEM: This is the system that generates the "data cell graph" according to the methodology of the present invention. The system may consist of physical components, e.g., blocks, pegs and/or magnets, as well as electronic, magnetic and/or pegged whiteboards. However, the preferred embodiment involves a computer software code that generates the graph on a computer screen with inputs coming from various sources and where a human being may interact with the graphical objects plotted on the computer screen. (see FIG. 18-3)

DATA SOURCES and FUNCTION TRIGGERS: This comprises external information that is acquired by the "graph system" from any number or combination of databases, software functions or applications, data tables, data files, voice mails, human real-time data entry or other possible means of providing information to the "graph system" for Graph behavior output processing. Function Triggers may also be system-generated or human-generated inputs that allow switching the "view" that slices and splices the data according to the selected "data element/cell component associations" and the selected "data input/component output value mappings".

DATA SETS: This comprises information from one or more different types of Data Sources may be combined and appropriately reformatted, translated and re-configured by the "graph system" to create information sets that contain sufficient information to produce the outputs to the "graph system".

DATA ELEMENTS: This comprises the various individual elements of a data set that, together, comprise all possible types of inputs to a data record to be converted through some functions and rules into the outputs of a "cell body". For example, data set A={data_element 1, data element 2, data_element 3 . . . data_element "n"}

DATA ELEMENT VALUES: These are the actual set of values of a given data element for any given record in a data set. For instance, data element 1 may equal one of {data_element 1_value 1, data_element 1_value 2 . . . data_element 1_value "n".}.

CELL BODY: This comprises a physical or graphical object that bundles together at least one physical cell component (PCC), at least one functional cell component (FCC) to drive stacking and sequencing behaviors, optionally one or more FCC's to drive non-stacking/sequencing behaviors and optionally one or more content cell components (CCC). The preferred embodiment of a cell body is such that the group of representative physical cell components is designed in such a way as to be tightly stacked in horizontal and/or vertical stacks with minimal wasted space. A representative cell body may thus bundle together the following: {PCC 1, PCC 2, PCC 3, FCC 1, FCC 2, CCC 1, CCC 2, CCC 3}

PHYSICAL CELL COMPONENTS (PCC): These are distinguishable physical characteristics bundled within a cell body that may be detected through at least one of the human senses, e.g., via sight, via sound or via touch, or through one or more non-human sensing devices.

PHYSICAL CELL COMPONENT VALUES: These values comprise the various possible values that can be expressed by a given PCC, where, for example PCC 1 may equal one of {PCC 1_value 1, PCC 1_value 2, PCC 1_value 3 . . . PCC 1 value "n".}.

FUNCTIONAL CELL COMPONENTS (FCC): These are distinguishable functional characteristics bundled within a cell body that causes the cell body to exhibit specific behaviors, given specific inputs, constraints and conditions to the associated functions. One mandatory, special case of FCC's for all "cell bodies" are the FCC's that drive the required stacking alignment, positioning and sequencing behavior of a "cell body" with respect to quadrants, categories and subcategories for the given "graph configuration". Another optional, special case of FCC's is the interdependency function between two or more "cell bodies". Hence the behavior of one given "cell body" may exhibit behavioral effects on one or more other "cell bodies", provided the two or more "cell bodies" are associated via interdependency functions.

FUNCTIONAL CELL COMPONENT VALUES: Theses values are the various possible cell body behaviors that can be expressed by a given FCC.

CONTENT CELL COMPONENTS (CCC): These components are the various placeholders which are associated with a cell body that act as containers for any form of informational, knowledge, physical entity or other content.

DATA ELEMENTS to CELL COMPONENTS ASSOCIATIONS: These are the one to one or one to many (except for any mutually exclusive cell components) auto-generated, or human defined associations between various types of data to the various types of cell components for a single record. Consider a single record in the "data set" that includes 3 fields of data, data_element1, data_field2, data_field3. These may be associated with Data Cell_component1, Data Cell_component2 and Data Cell_component3 respectively. Note that a single graph shell may be associated with one or more possible human or system-defined "data element/cellcomponent associations". Hence, the appearance and behavior of the currently active "graph"

DATA ELEMENT to CELL COMPONENT INPUT/OUTPUT VALUE MAPPINGS and CONVERSION FUNCTIONS: After the various associations are defined between "data elements" and the various "cell components (physical, functional and content)" for a given "graph configuration", the next step is to either system-generate or human pre-define the mappings and related conversion functions that convert the "data element values" to respective "cell component values" or behaviors. These mappings may be one to one or one to many. One or more complete sets of definitions of "value mappings" may be human or system-defined to a given "data element/cell component association". Hence, the appearance and functional behavior of a "graph" depends on the currently active "value mapping" for the currently active "data element/ cell component association" within the currently active "graph shell".

GRAPH COMPONENTS: These components are the various interactive and/or structural components that, together, form all physical elements of the graph as contained within each graph shell. Graph components thus include the physical graphing elements described herein, e.g., quadrant cells, category cells, subcategory cells, data cells and the various cell components that comprise the data cells.

GRAPH CONFIGURATIONS: These configurations are the definitions of parameters that define all the graph appearances, functions and behaviors. A given graph configuration may include, for example, the choice of cell components to be included in a graph shell, the cell component mappings for category cells, subcategory cells and data cells, the total number of cells to be populated per graph shell page view before going to the next page, the height and width of a graph shell, the size of the cells, the choice of including quadrant cells and other graph components or behaviors.

GRAPH SHELL: This comprises a dedicated graph plotting area that applies the currently active "graph configuration" to the associated "graph data set". One graph shell may apply one or many different graph configurations to the same data set. When a system user activates a particular graph configuration, the graph shell plots the graph according to the cell component mappings of the selected configuration. Hence, in one graph configuration, "team assignment" may be mapped to the "shape 1" data cell component and in another graph configuration, "team assignment" may be mapped to the "color of shape 1" data cell component. Hence, several different graph configurations can be applied to the same graph data set within a graph shell to slice, splice the data in different ways.

QUADRANT: A quadrant is an optional "graph component", not always present in a given graph configuration, represented by a "graph shell" containing a complete graph with at least one category, one or more a subcategories and data cells. Quadrant cells can be arranged as two or more in a row or a column, or four or more in a grid formation. "Data cells" can be drag/dropped from within one "quadrant cell" to another.

CATEGORY CELL: These are a type of categorical "cell body" at the top of the cell stacking hierarchy. In the preferred embodiment, "category cells" are aligned horizontally along an axis. Category cells may directly stack in an orthogonal alignment against one shell page-view of "data cells", or a combination of "subcategory cells stacked with data cells", or a combination of "subcategory cells, stacked with sub-subcategory cells, stacked with data cells", or other combinations of hierarchical cell stacks.

SUBCATEGORY CELL: These are a type of categorical "cell body" that are next in the hierarchical stacking sequence to their related "category cells". Subcategory cells are stacked in an orthogonal direction versus their respective "category cells". Subcategory cells may directly stack in the same-direction alignment with "sub-category cell stacks" plus "data cell stacks", or directly with "data cell stacks", or other combinations of hierarchical stacks that fall beneath the subcategory cell stack sequence. The drawings for the present invention show various possible configurations and stacking rules for subcategory cells.

SUB-SUBCATEGORY CELL and DATA CELL: These are a type of categorical "cell body" that are next in the hierarchical stacking sequence to their related "subcategory cells". There may be an unlimited number of hierarchies of sub-subcategory cells, but the preferred embodiment includes one level that performs a "snaking cell stacking" action with respect to its overall corresponding hierarchical subcategory cell. Sub-subcategory cell stacks align in the same direction as their corresponding "subcategory" cells and the final sub-subcategory cell at the lowest end of the hierarchy are given the special name of "data cell".

CELL STACK: There are several nested "cell stacks" contained within a "graph shell", each with hierarchical stacking sequence rules and respective configurations. In general, for a top-down preferred embodiment, "category cells" stack above respective "subcategory cells", which stack above respective "sub-subcategory cells", which stack above "data cells". The name "stack" refers to the tight, space-saving proximity and alignment of "body cells" in either horizontal or vertical axes, where the center axes and/or left and/or right edges of the "body cells" are perfectly aligned to create stacks similar to the appearance of graphical objects aligned in rows and/or columns.

CELL STACK SNAKING: This refers to an optional "graph configuration" that allows the application of a "snaking" rule assignment to "body cells" as required, with the exception of "category cells" that remain on a fixed axis. Snaking refers to a migration path of "body cells" within a "cell stack" such that when a pre-defined maximum number of "body cells" has been achieved for a given "cell stack", the excess "body cells" perform a "snaking" action that causes the categorical body cell above to widen in such a way as to incorporate an additional "cell stack". Hence, a "category cell" aligned in a horizontal axis, with a top-down stacking configuration may widen across a width of two, three, or more "cell stacks" that migrate in a "snaking action", where the extra cell pops up to the top of the second stack, and the next extra cell pops up to the top of the third stack and so on, to accommodate a limited cell stack height.

The following Table 1 is provided as an example of data input to component output mapping for a cell body.

TABLE 1

| DATA ELEMENT | ASSOCIATED CELL COMPONENT | DATA ELEMENT INPUT VALUES | INPUT/ OUTPUT CONVERSION METHODS | CELL COMPONENT OUTPUT VALUES |
| --- | --- | --- | --- | --- |
| Data_Element1 (DE1) | Physical_Cell_Component1 (PCC1) | DE1_Value1 | Functions and Conditions | PCC1_Value1 |
| | | DE1_Value2 | Functions and Conditions | PCC1_Value2 |
| | | DE1_Value3 | Functions and Conditions | PCC1_Value3* |
| | | DE1_Value4 | Functions and Conditions | PCC1_Value3* |
| | | DE1_Value5 | Functions and Conditions | PCC1_Value3* |
| Data_Element2 (DE2) | Content_Cell_Component1 (CCC1) | DE2_Value1 | Functions and Conditions | CCC2_Value1 |
| | | DE2_Value2 | Functions and Conditions | CCC2_Value2 |
| | | DE2_Value3 | Functions and Conditions | CCC2_Value3 |

TABLE 1-continued

| DATA ELEMENT | ASSOCIATED CELL COMPONENT | DATA ELEMENT INPUT VALUES | INPUT/ OUTPUT CONVERSION METHODS | CELL COMPONENT OUTPUT VALUES |
|---|---|---|---|---|
| Data_Element3 (DE3) | Functional_Cell_Component1 (FCC1) | DE3_Value1 | Functions and Conditions | FCC1_Result1 |
| | | DE3_Value2 | Functions and Conditions | FCC1_Result2 |

*example of 1 to many relationship.

Description of FIG. 1

FIG. 1 shows an overall system diagram of an embodiment of the subject invention, in which a project is first selected for application of the system and method via step 24, and next categories, super-tasks, tasks and subtasks for the project are designated in step 26. It should be appreciated that categories, super-tasks, tasks and subtasks are systematically connected, such that a category is designated and is comprised of super-tasks which can, and are themselves broken into tasks, which are in turn broken into subtasks. By way of example, if the category designations are departments or stated another way, if there are also subcategories and the categories are regions and subcategories are departments), then under each category are super-tasks, tasks, and subtasks are designated in step 26. Thereafter, a hierarchical data model is created via step 28 based upon the categories first, and super-tasks, tasks and subtasks next for each category.

In critical distinction from all of the prior art methods and systems, once the hierarchical data model is created via step 28, it is inverted via step 30 such that the subtasks are shown on top, and the tasks, super-tasks and categories are represented below. The shapes containing each element are fitted such that shapes containing subtasks are seamlessly fitted such that they may be stacked geometrically to fit within the width boundaries of the higher level tasks at the step below. In this stacking mechanism, all of the white space can thereafter be eliminated as a result of the special geometries invoked and the image compressed. Thereafter, the status of each sub-task can be revealed and modified via step 34, such that real time changes can be indicated, as the project evolves. The subtasks are thereafter rearranged via step 32 such that they may be inserted in a status category for each, in at least one embodiment, described below, in which the status is either "not started," "started," or "done." Accordingly, all of the subtasks in a particular task, super-task and category are stacked in accordance with the designated status and, utilizing the method and system, can be rearranged to a different status to reflect real-time change in actual status. Thus, via step 36, the method and system permits the creation, display and modification of an electronic spreadsheet with the "y" axis representing the stacked subtasks having associated status (as shown in the "x" axis) for each.

One of ordinary skill in the art will well appreciate that by stacking the sub-tasks in accordance with their respective statuses in the manner indicated herein, a visual pattern of icons is shown on the monitor of a computer which, while involving blocks or icons can also achieve a visual curve presentation which represents a "snap shot" of the then actual statuses of each of the subtasks, arranged in accordance with tasks, super-tasks and categories. Thus, after rearrangement in accordance with a later point in time, one can compare performance from the earlier electronic spreadsheet visual presentation to the latter and compare either bar-type graphs (of block movements) or actual curves representing performance. Also, one can predict a future movement based upon anticipated dates of transition between statuses over time.

Figure 2:
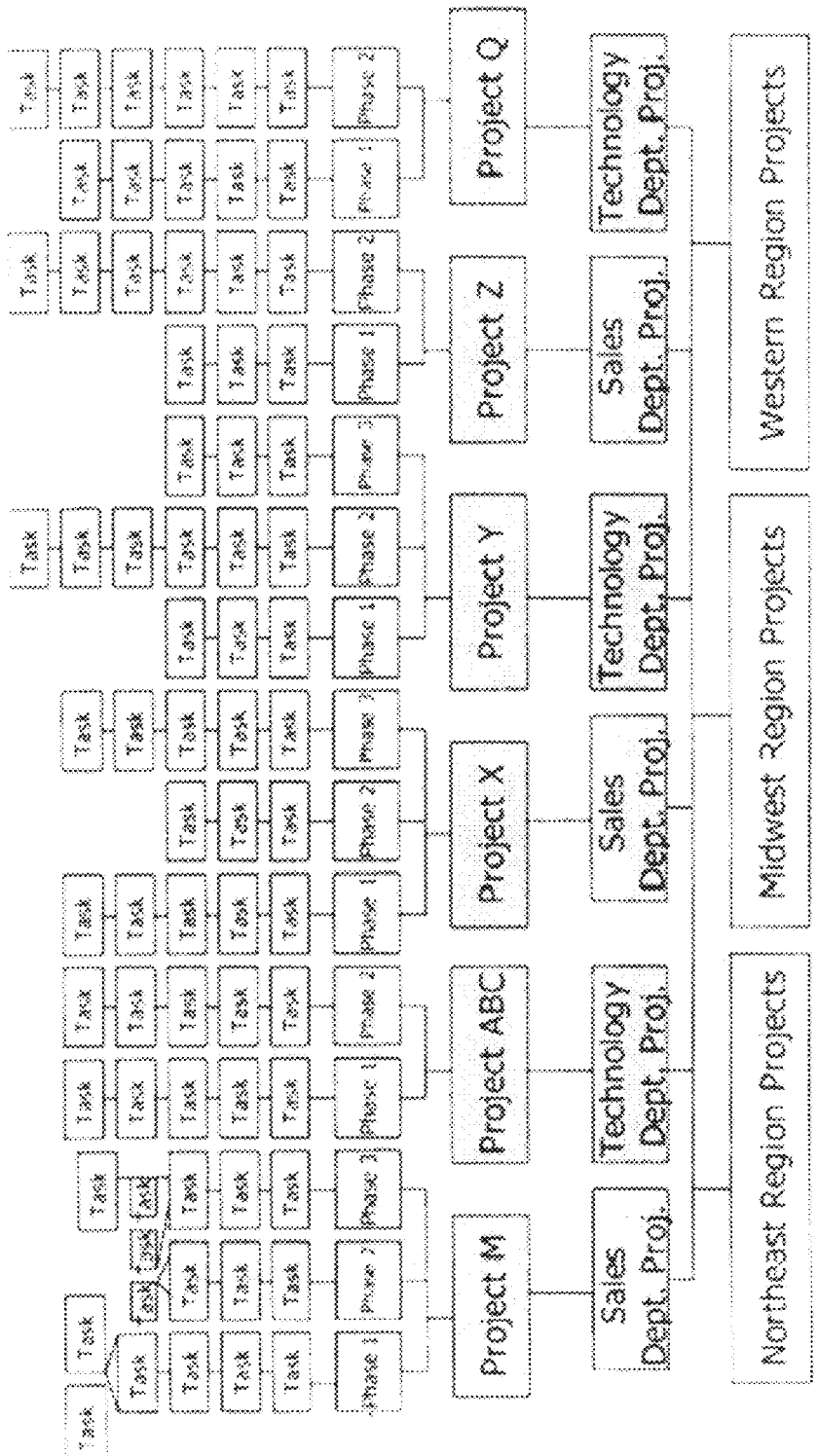
FIG. 2 is a visual representation of a rearrangement of the FIG. 1 prior art structure to demonstrate "bottom up" styled redesign, in accordance with a phase of the present invention.
Figure 3:
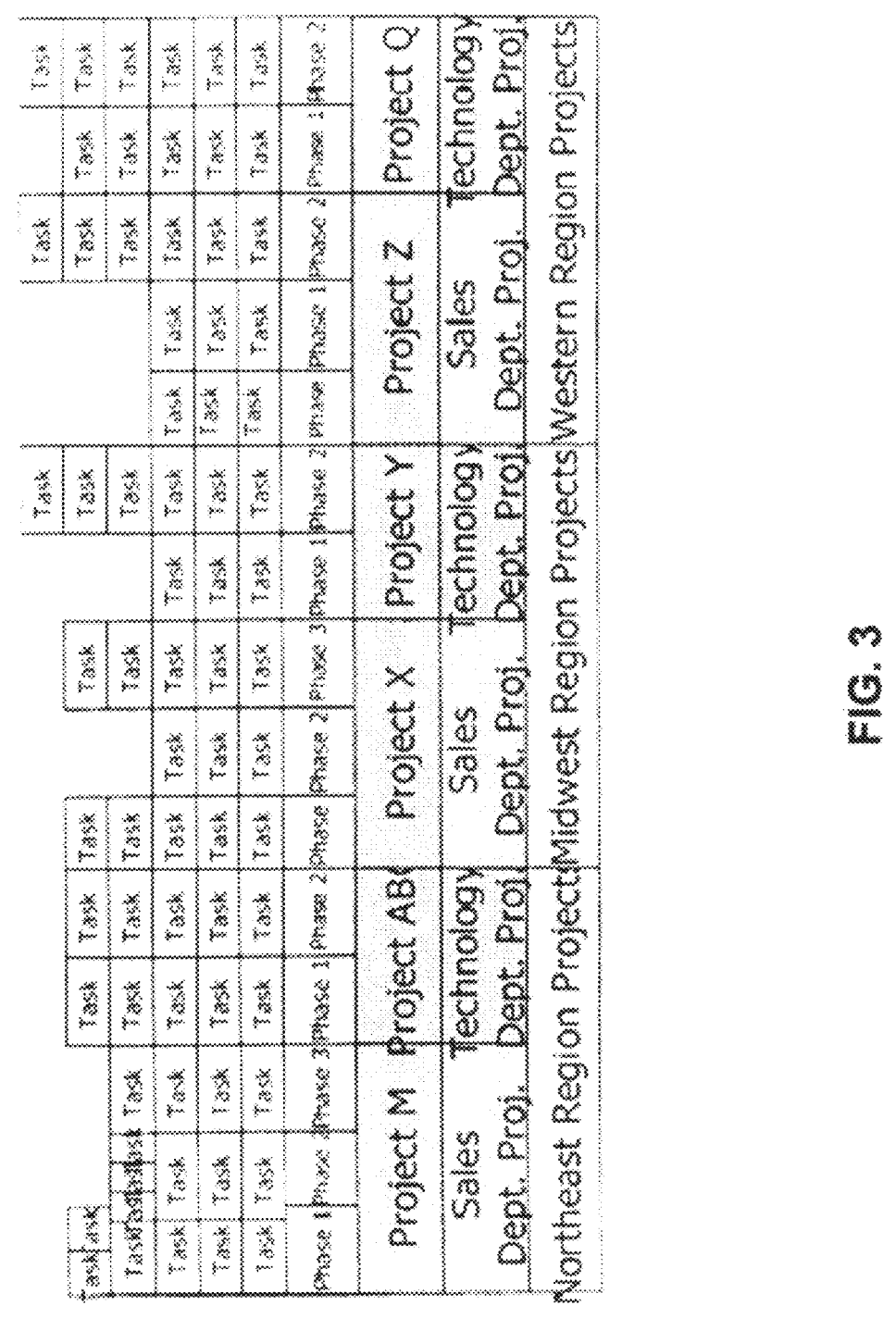
Figure 4:
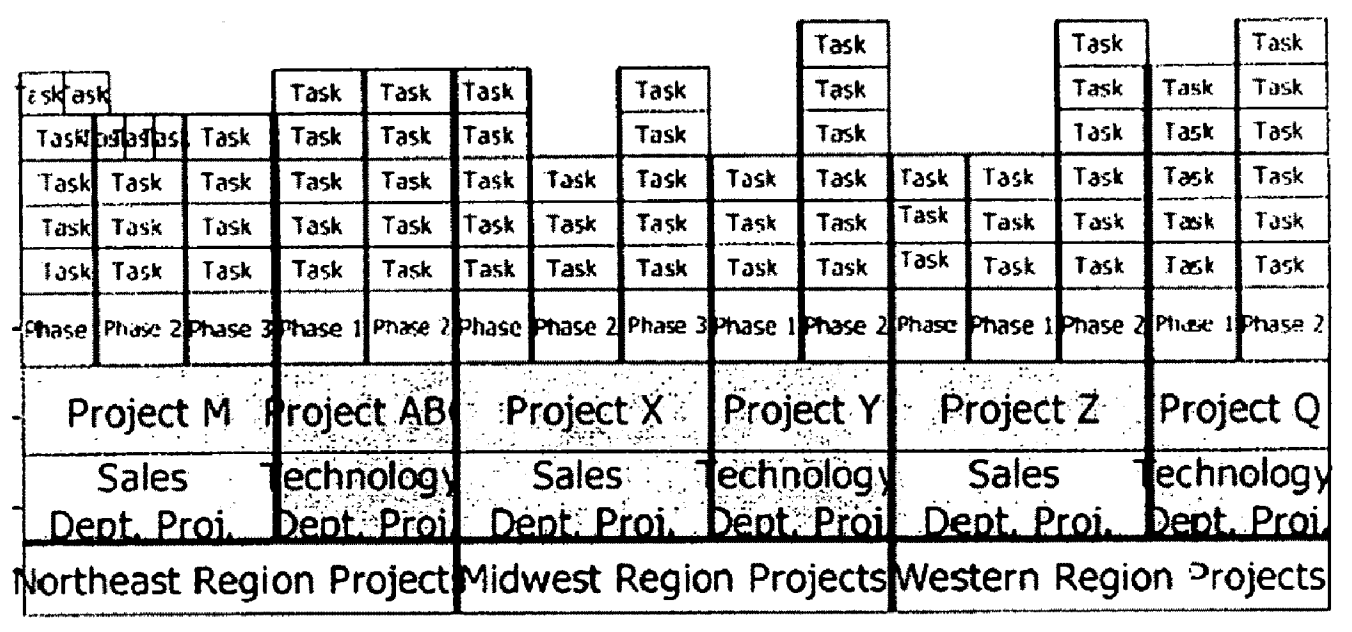

Description of FIGS. 2 to 4

For the purpose of explanation only, FIG. 2 shows a portion of the system and method in distinction from that of the prior art. It can be appreciated that FIG. 2 shows (in accordance with step 30 as shown in FIG. 1), a "bottom up" display with tasks at the top Now that the inversion (step 30 in FIG. 1) has occurred, as shown in FIG. 2, it should be appreciated that substantially all of the blank white space can be eliminated, and the image compressed, as shown in FIG. 3. Thereafter, demarcations that conform to categories, super-tasks and tasks can be created, as shown in FIG. 4, and one of ordinary skill in the art can now realize the visual presentation and simplification shown by the inversion and compression steps in accordance with the subject invention.

Figure 5:
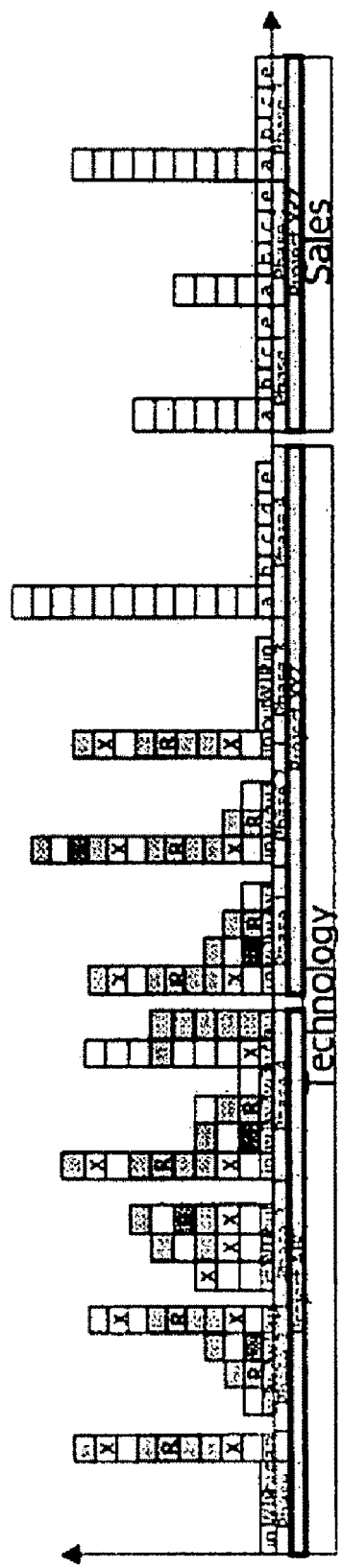
FIG. 5 is a bird's-eye view of an example of a live project mapped in accordance with a preferred embodiment of the present invention.

Description of FIG. 5

The improvement of the present invention is further demonstrated by the view shown in FIG. 5, because beyond the rearrangement (inversion and compression) carried out by the present invention, the individual subtasks can also be oriented in accordance with each respective status, which provides a visual presentation ability heretofore unknown to the art. FIG. 5 reveals a number of subtasks stacked in accordance with the subject invention in one of a plurality of statuses, and a visual curve (block or otherwise) is revealed which represents an electronic spreadsheet or "snap shot" of that point in the project's life cycle. As shown, the categories are broken into technology and sales for descriptive purposes only, and are not to be construed as limiting the types, nature and number of such categories.

Figure 6:
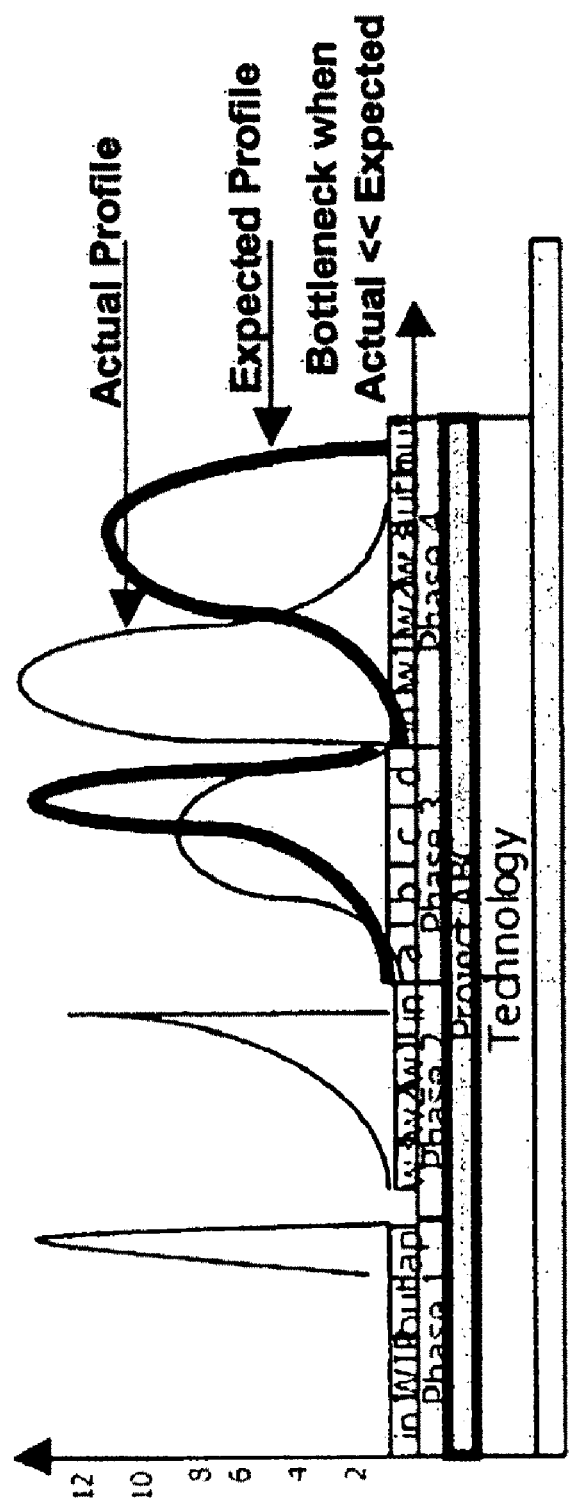
FIG. 6 is a two-dimensional view of an actual versus expected curve comparisons of live project behavior, modeled in accordance with another embodiment of the present invention.

Description of FIG. 6

FIG. 6 represents a curve-based view of the electronic spreadsheet provided by another aspect of the present invention, in which an actual profile is overlayed upon an expected profile, in order that a bottleneck can be identified in real time. Hence a project manager can focus on the subtasks that are bottlenecked, for determination of responsibility from the original category, and can discuss and improve performance with those persons the actual performance by whom lagged behind the expected performance. It should be appreciated that the expected profile was determined based upon the project planning by designating dates and/or times in which the status of an individual subtask was expected to have changed from its original "not started" point to some other point. At a future date of tracking, when one or more subtasks in reality switched statuses, the dates recorded at the actual time of switching represents the actual profile, such that the comparison could be made, as shown in FIG. 6.

Figure 7:
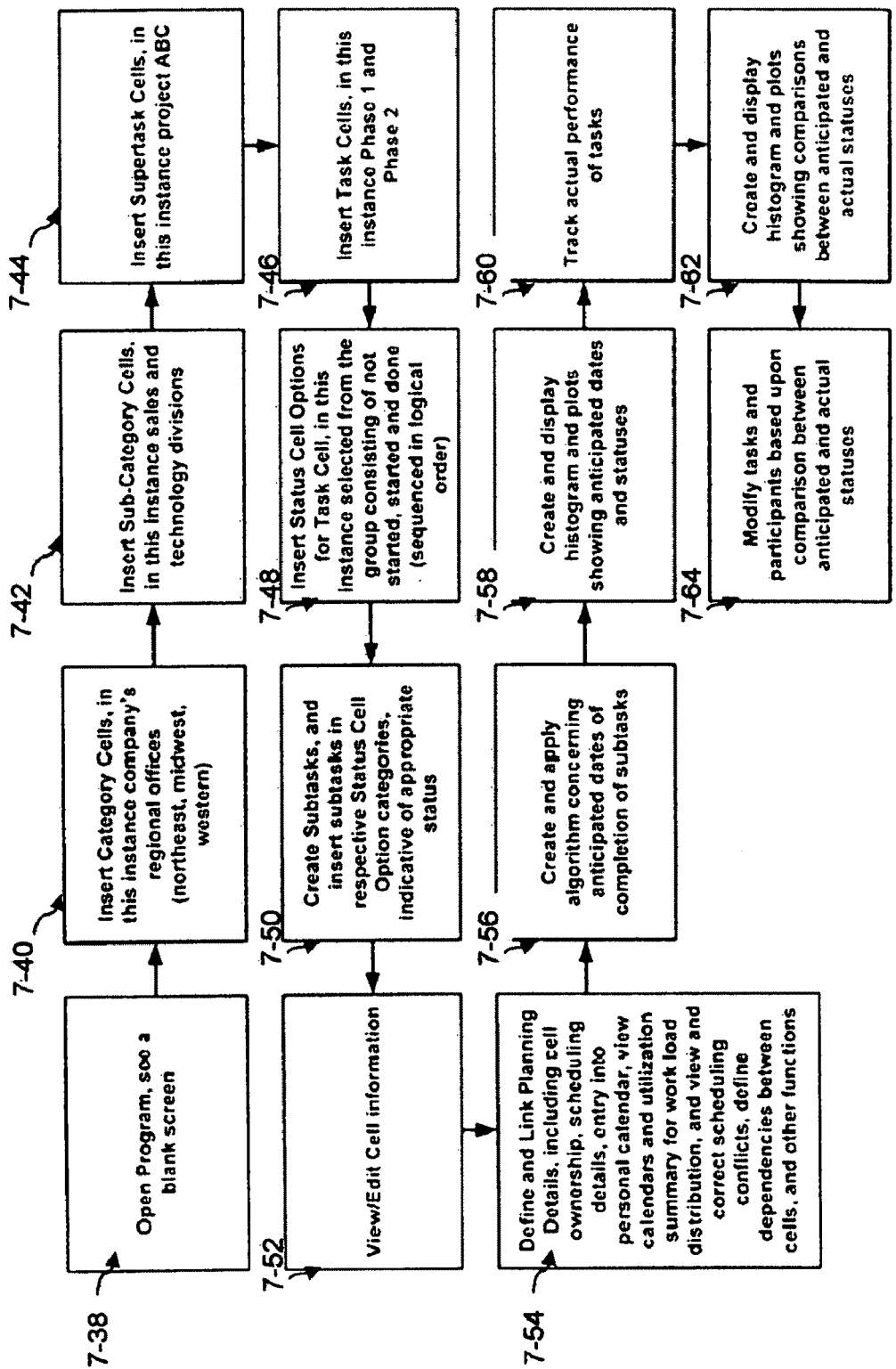
FIG. 7 is a process flow chart of a preferred embodiment of the present invention.

Description of FIG. 7

FIG. 7 shows a flow chart of the system in accordance with a preferred embodiment of the present invention. In step 38, the program or device (preferentially a computer-based program) is opened and a blank screen is seen. The user of the device, via step 40, then inserts category cells, in this instance a company's regional offices (northeast, mid-west and western) to conform to the example shown in FIG. 2. It should be appreciated that the example is for example purposes only, and should not be construed as limiting the subject invention to the specific categories shown. To conform to this example, sub-category cells (in this instance sales and technology divisions) are inserted next via step 42. Super-task cells (in this instance project ABC) are inserted via step 44. Task cells (in this instance phase 1 and phase 2) are inserted via step 46. Status cell options are then created via step 48 (such that subtasks can be inserted into the requisite status column, via step 50). In this instance, three status cell options are selected (not started, started and done), although a greater, lesser or a different group of such options can be selected without deviating from the letter, spirit or scope of the subject invention. These three statuses are most convenient in operation, since they reflect actual statuses for most, if not all, of task functions that start and end over a period of time.

Once the status cell option columns have been created by step 48, the subtasks can be created via step 50 and placed within the respective status cell option categories, indicative of the appropriate status. Thus, for example, subtasks that have not been started are stacked in the column of "not started," those that have been started in the column "started" and those completed in the column "done." It should be well appreciated at this point, that histograms taken at different actual points of time will reflect actual statuses which have varied from commencement until that point in time, and hence each graphic data cell can be compared with other graphic data cells to show trends and tracking, in a profound manner, in comparison to that heretofore known in the art.

Step 52 permits the viewing and editing of cell information on the monitor of a computer which enables modifications and corrections, as well as movement to various status categories.

Step 54 permits the definition and linking for planning details, including cell ownership (management, teams and action performers), scheduling details (in this instance start dates and end dates), cross-referencing for entry into personal calendars (such that the calendar of an individual is updated, conflicts checked and resolved, and the individual can then and thereafter know the schedule), utilization summaries can be shown (linked and/or verified) for workload distribution, dependencies between cells can be created (that is, "if-then" type situations where one subtask depends from the start and/or completion of another), conditional algorithms can be created for automatic processing (like email and/or voice mail alerts) and visual indication (like flags and the like), and other functions can be performed that those of ordinary skill in the art will easily comprehend by access to the subject invention and its description contained herein.

Step 56 powerfully enables the creation and application of algorithms to switch the status for subtasks based upon predetermined switch times, such that the method and system can permit the user to determine the histogram at another, future point in time, based upon the anticipated start and end times for the individual subtasks.

Step 58 enables the creation and display of histograms, which enables plotting showing subtasks in their current statuses in a histogram-styled view.

It should now be abundantly evident, that the method and system permits tracking of actual performance (via step 60) of subtasks, tasks, and super-tasks, as the subtasks transition between statuses, also triggering conditional agents (email triggers, batch processing, and the like) and the maintenance of historical logs showing the status transitions over time (actual). Likewise, historical logs can be utilized to calculate anticipated statuses transitions over time.

Thus, comparisons between anticipated and actual statuses are created and displayed on an electronic spreadsheet via step 62. Such display can be in snapshot form (see, e.g., FIG. 5 and FIG. 6) or animated such that the time-based sequence of change is shown. Thus, interdependent and correlated functions (causally related like "if-then" functions) across an enterprise (normally invisible by way of traditional tools) are now made easily viewable.

Lastly, subtasks, tasks and super-tasks can be modified and the participants changed via step 64, based upon anticipated and actual statuses, as time progresses and the categorical projects are performed.

Description of FIG. 8

Figure 8A:
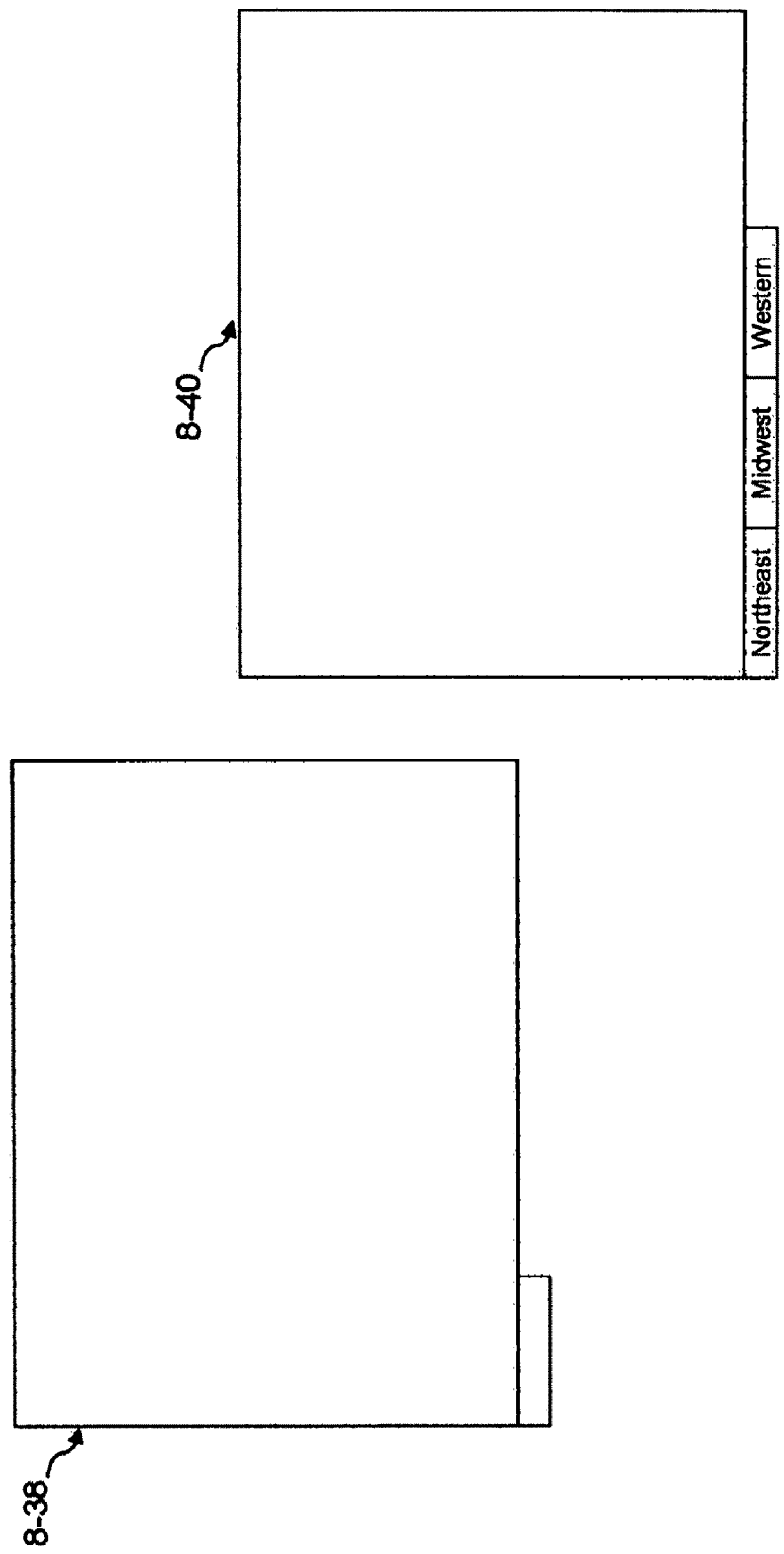
FIG. 8 (A) through FIG. 8 J) show screen captures of the process shown in FIG. 7, in accordance with a preferred embodiment of the present invention.
Figure 8B:
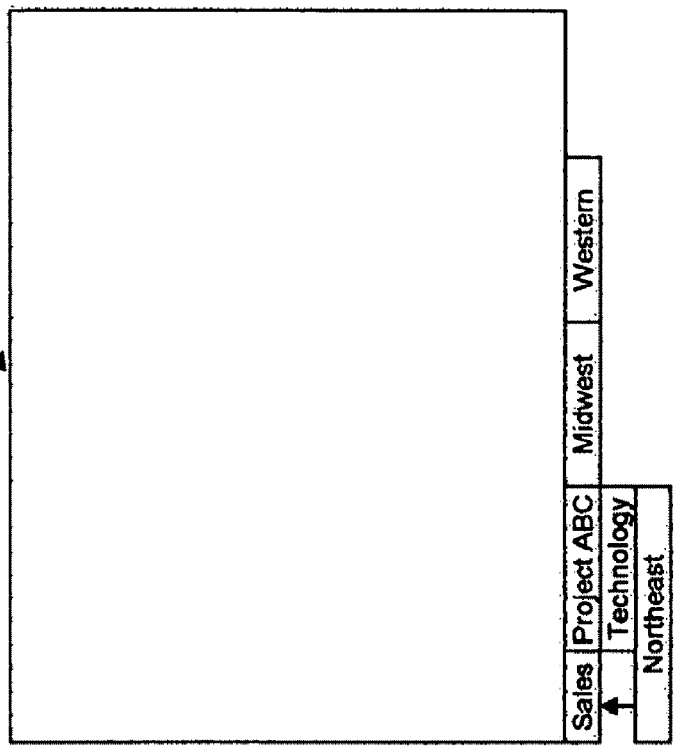
Figure 8C:
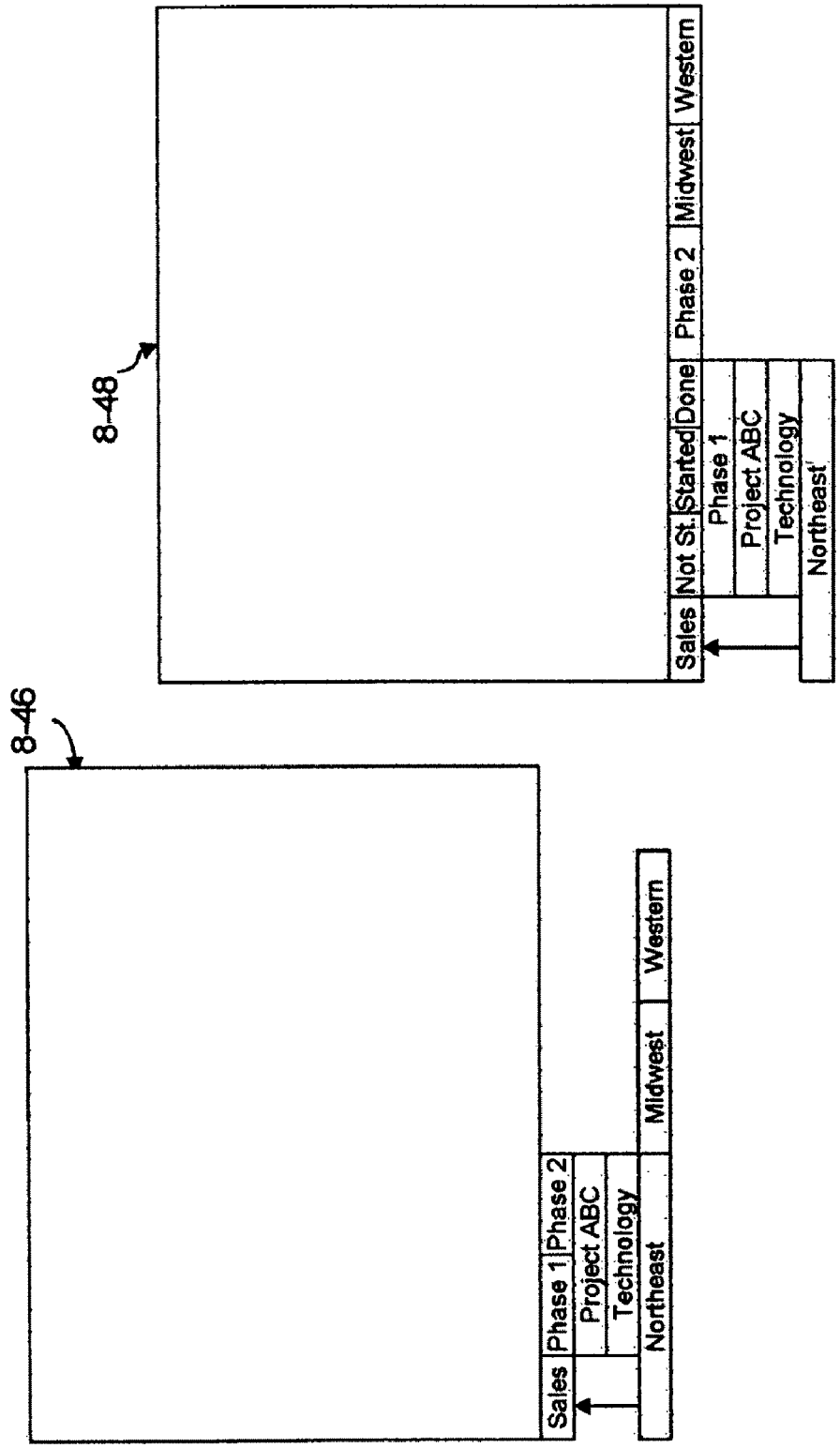
Figure 8D:
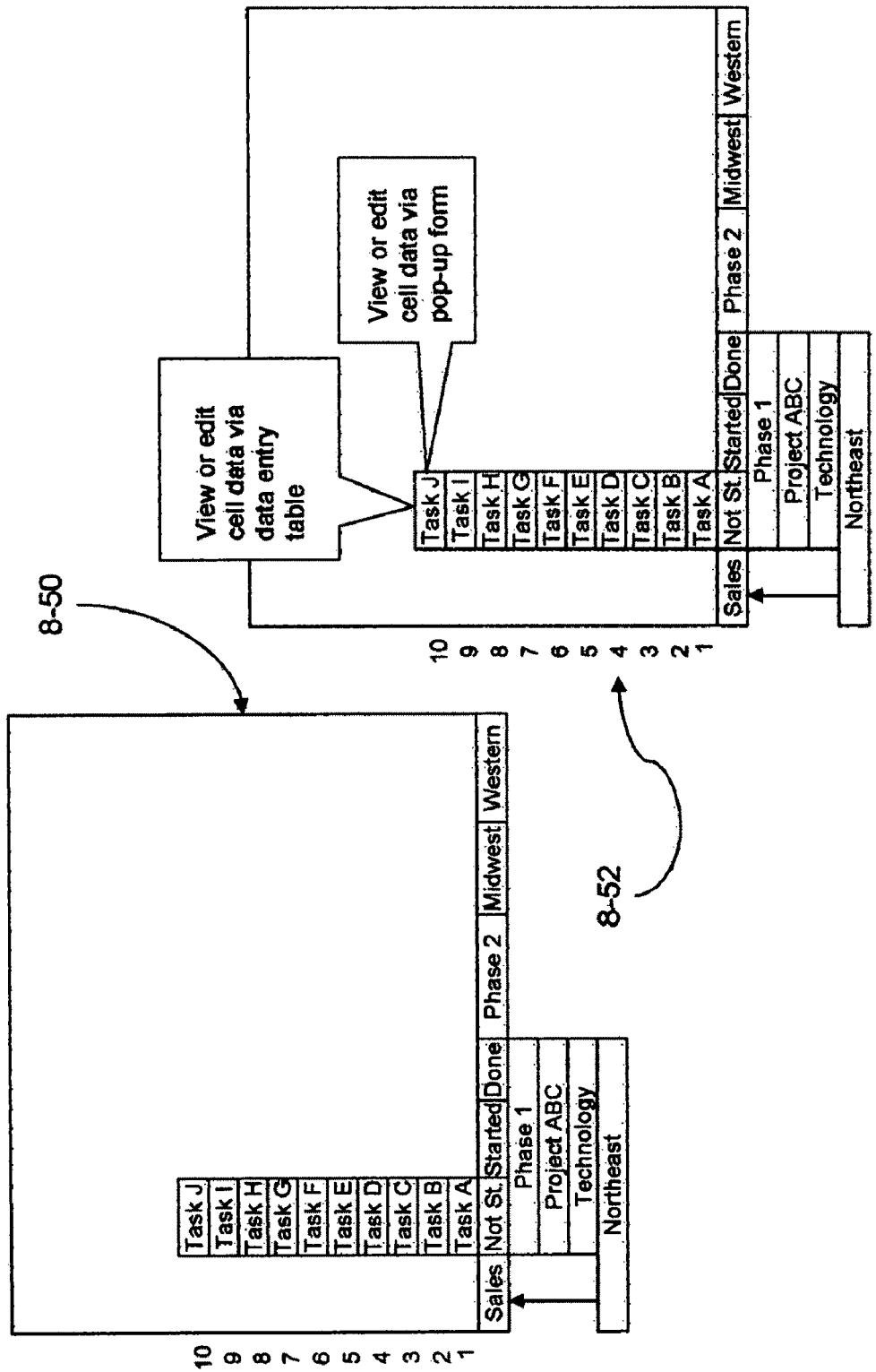
Figure 8E:
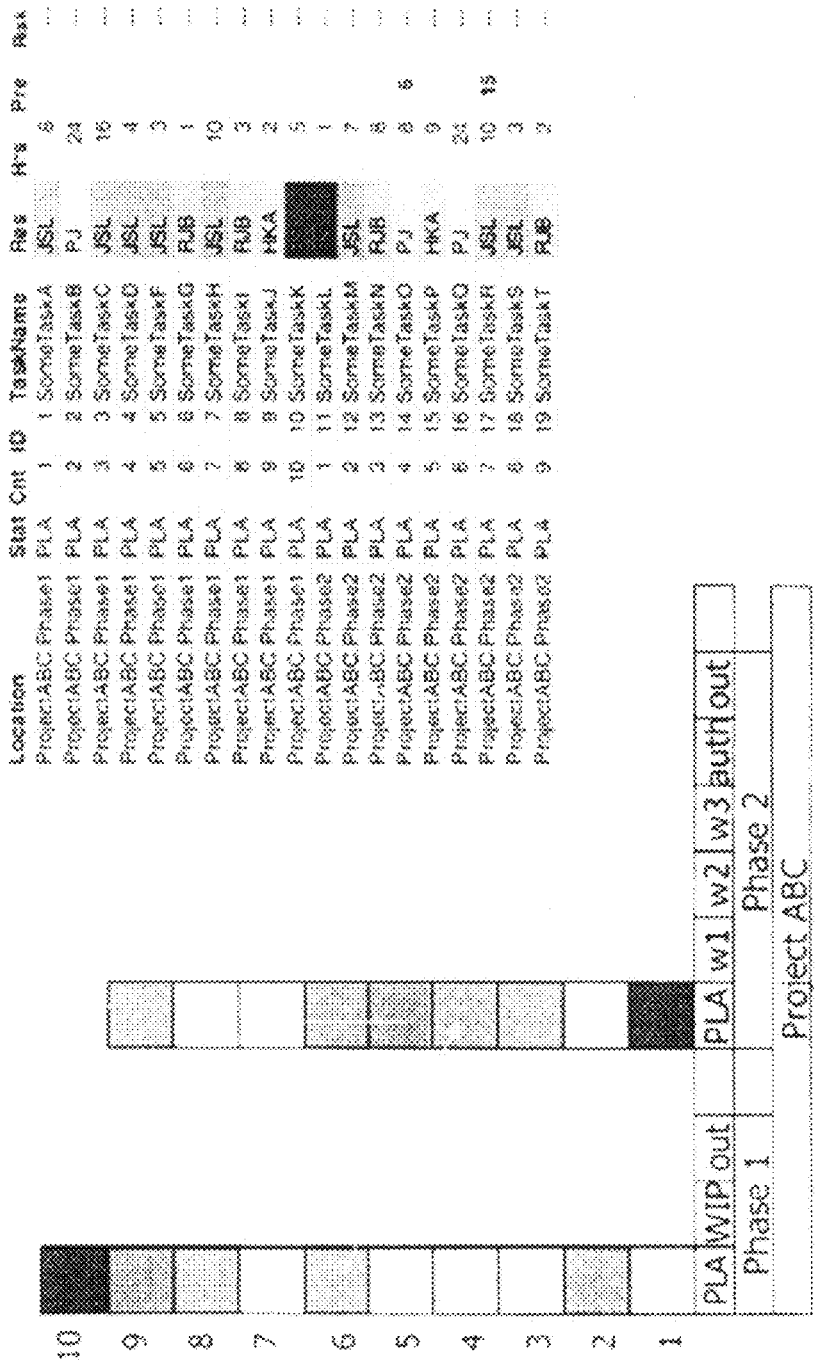
Figure 8F:
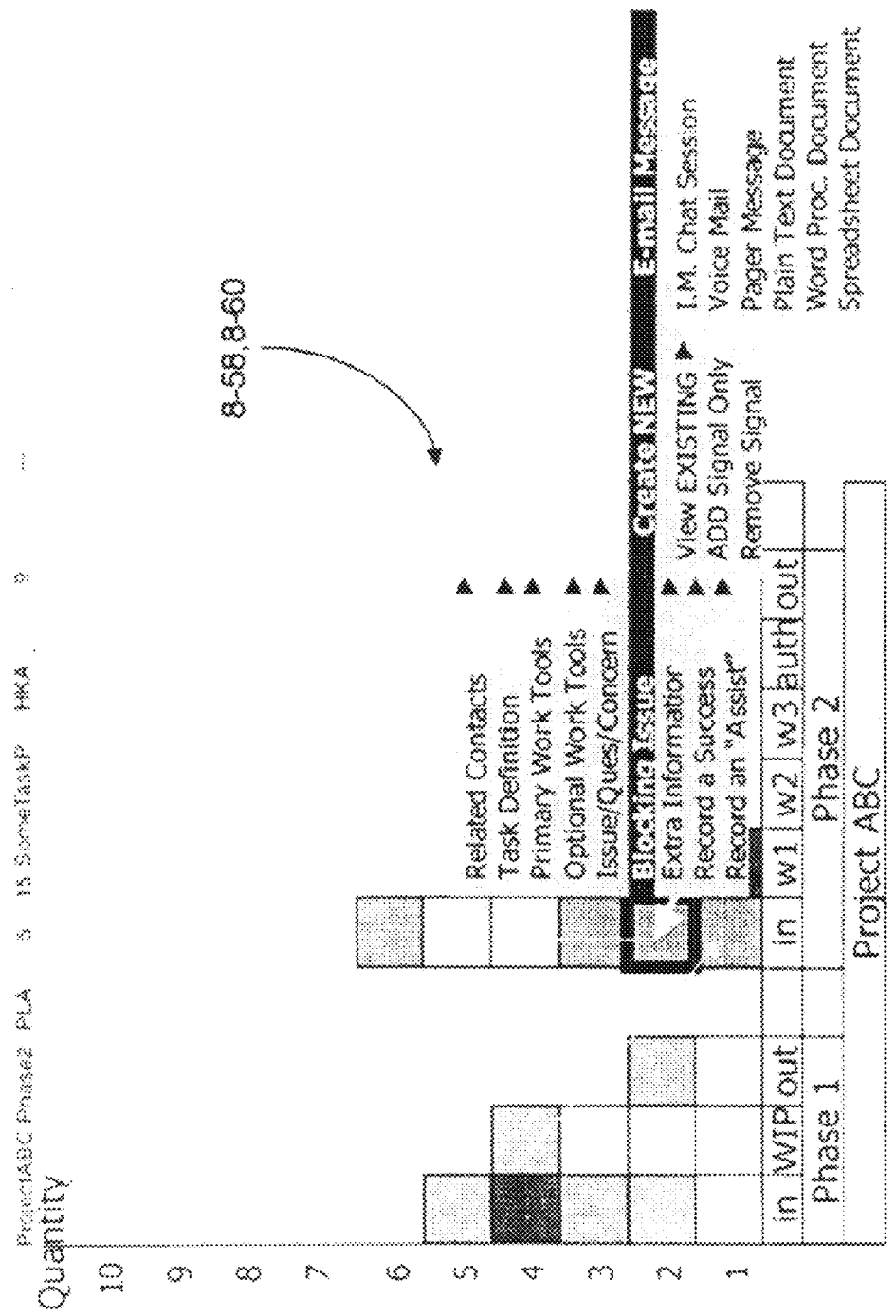
Figure 8G:
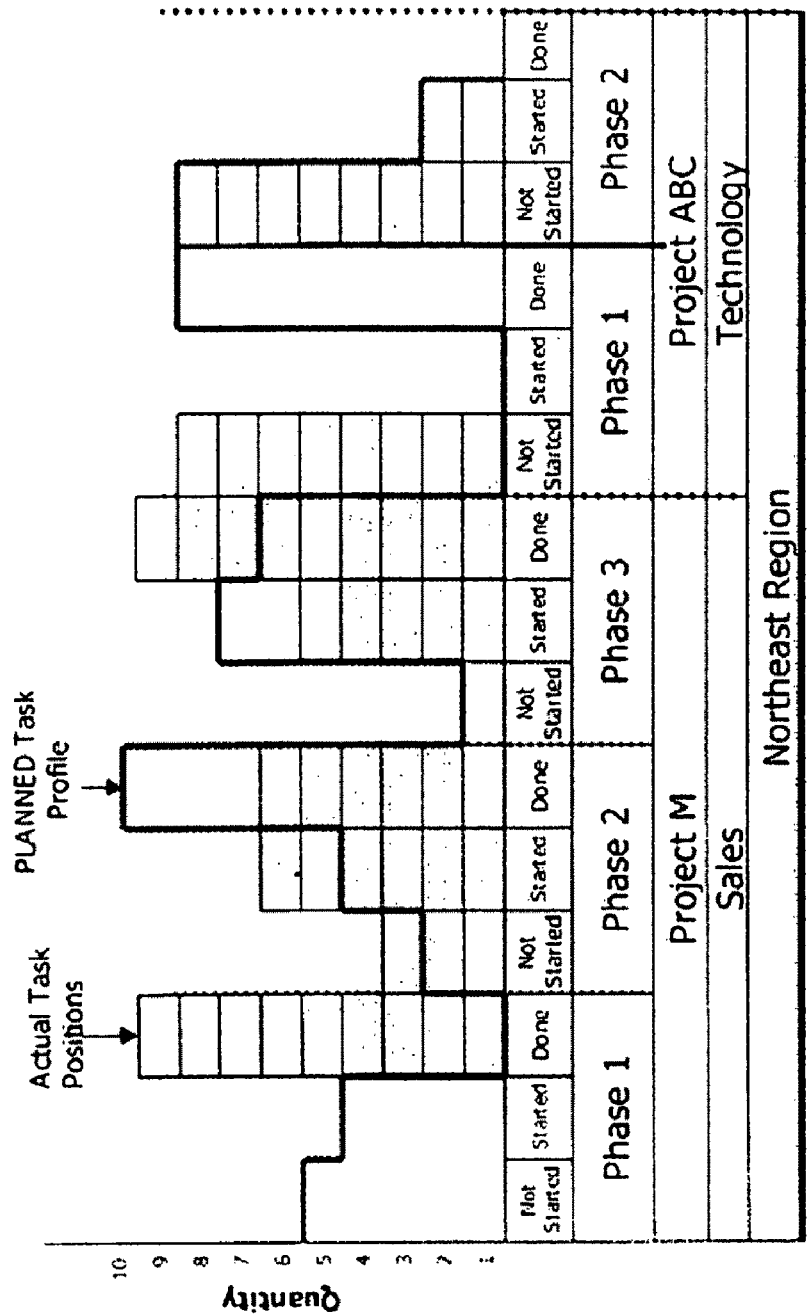
Figure 8H:
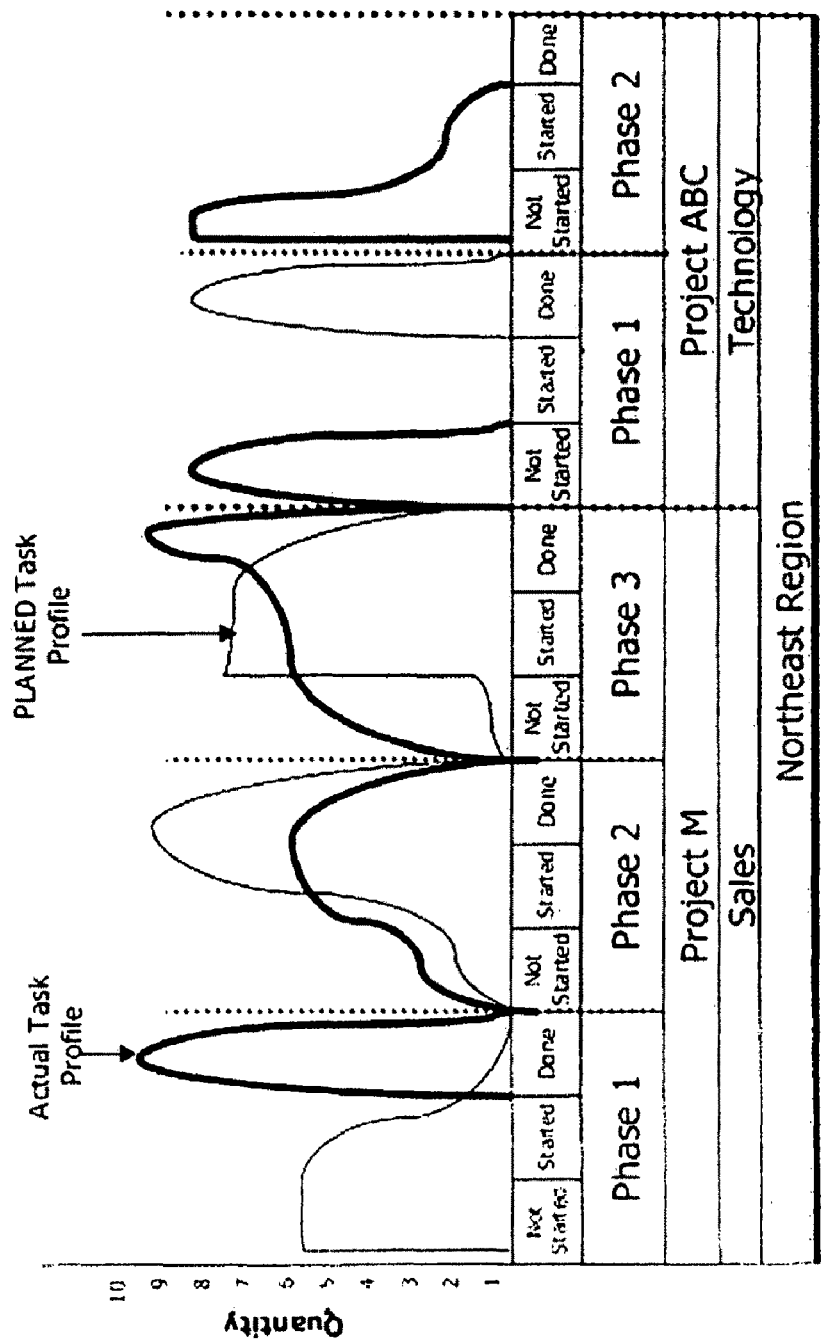
Figure 8L:
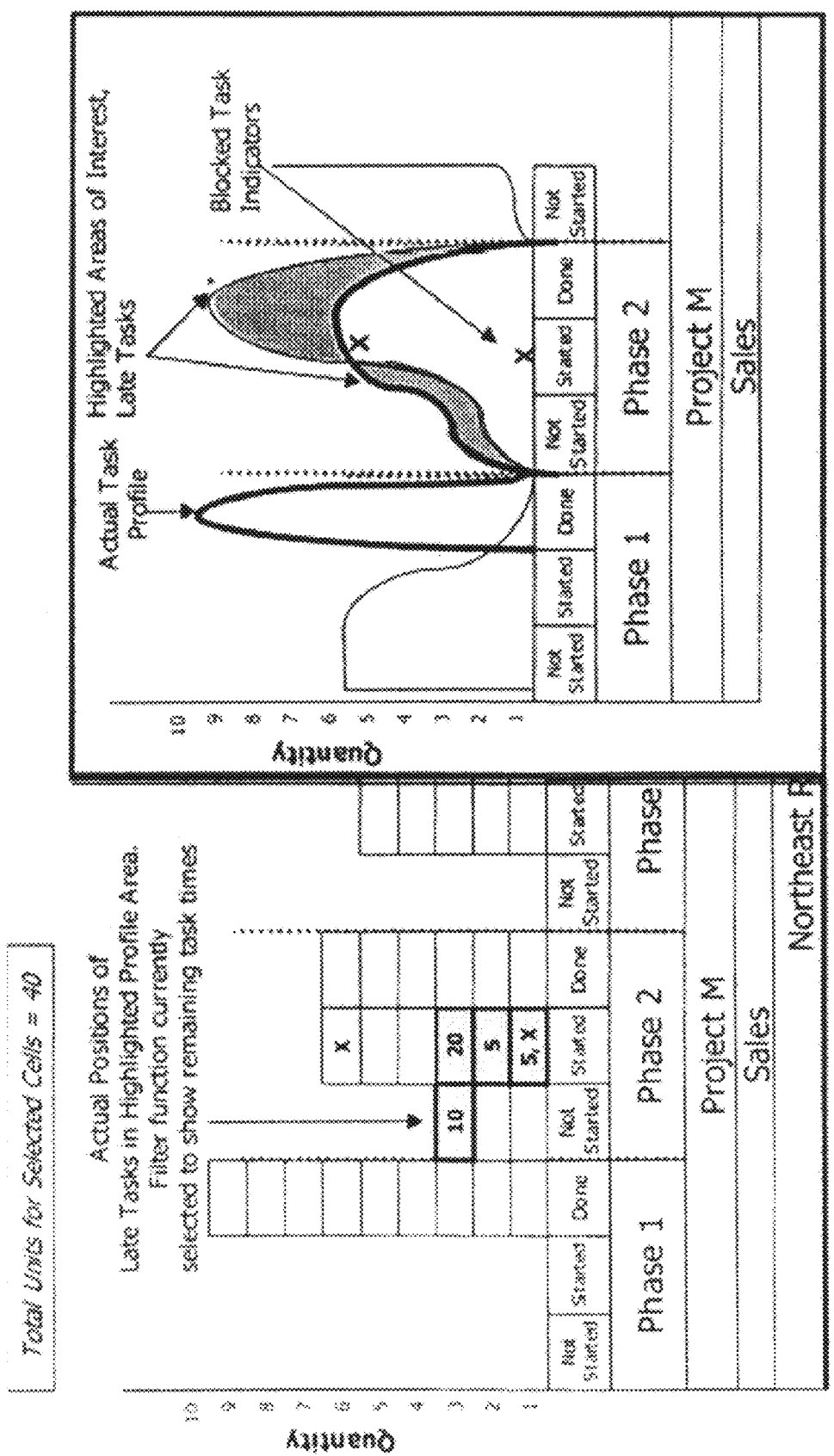
Figure 8J:
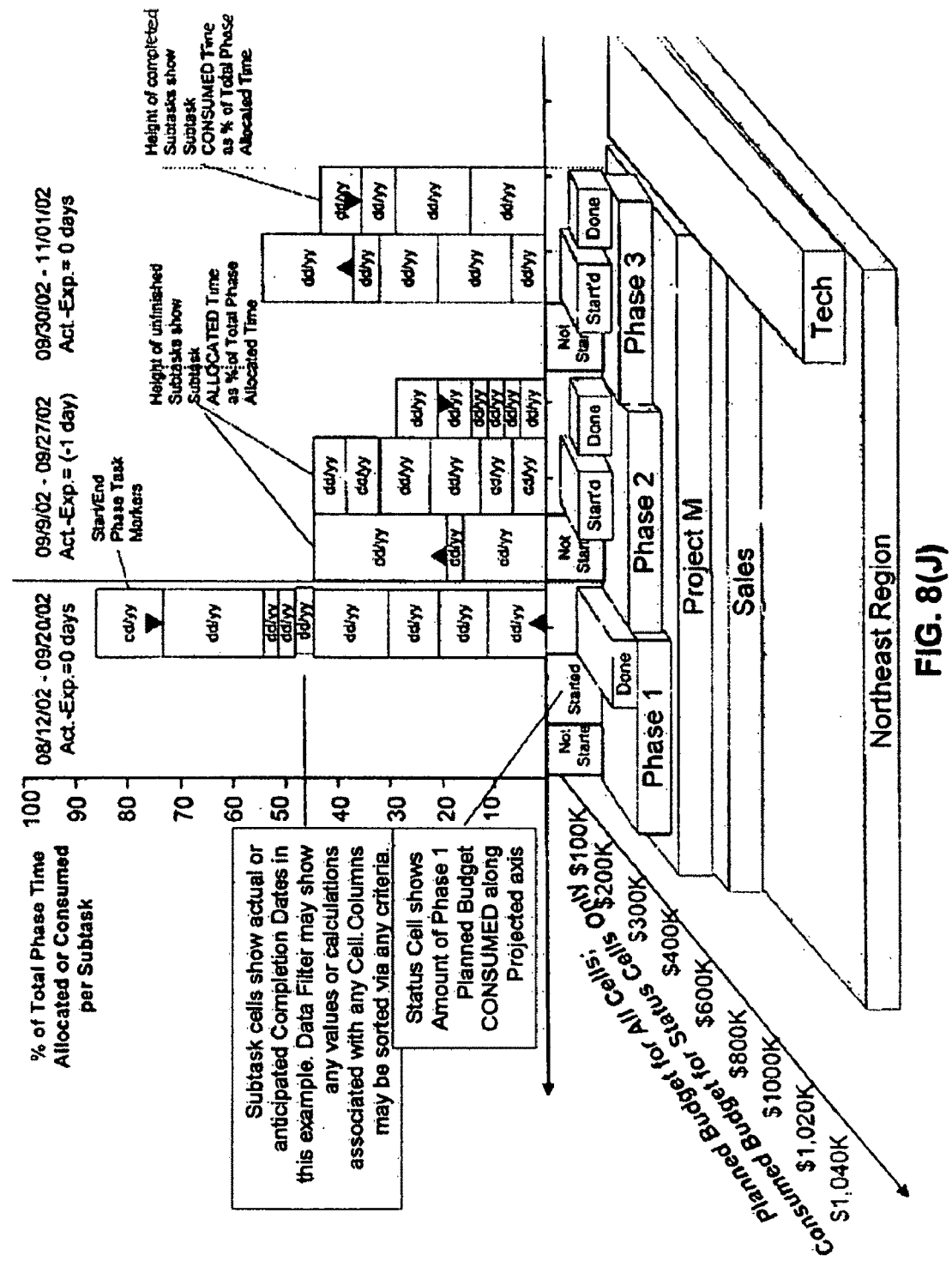

FIG. 8(A) through to FIG. 8(J) show the individual screen captures as shown on an electronic graph for each of the categories, the graph comprising orthogonally stacked data cells comprising graphical objects that consists of one or more geometric shapes in a tight grouping, which together, represent several variables of a single data element, wherein each data cell may be a cluster of one or more graphical objects produced by the method and system in implementation, connected to the steps shown in FIG. 7, in which the step numbers bear the same numbers as the screen captures shown.

FIG. 8(A) shows the opening step 38 and category insertion step 40.

FIG. 8(B) shows the insertion of the sub-category step 42 and of the super-task cells 44.

FIG. 8(C) shows the insertion of the task cells 46 and of the status cell options 48.

FIG. 8(D) shows the creation of the sub-tasks step 50 and also shows the viewing and editing steps 52.

FIG. 8(E) shows the defining and linking steps 54 and the creation and applying steps 56.

FIG. 8(E) also shows the terms "PLA" which means planning status, "WIP" which means work in process, and "out" which means "done." It should be appreciated, as stated herein above, that the statuses can change to meet the specifics of the program.

FIG. 8(F) shows the creation and display steps 58 and the tracking step 60.

FIG. 8(G) shows the creation of an actual electronic graphic data cell (via step 62, see FIG. 7), which, in this representative embodiment, has a category of "northeast region," sub-categories of "sales" and "technology," super-tasks of "project M" and "project ABC," tasks of "phase 1," "phase 2," and "phase 3," and individual tasks placed in statuses "not started," "started," and "done."

FIG. 8(G) shows the actual task positions the electronic data cell graph against planned task profile (the step curve), and true project management is enabled.

FIG. 8(H) shows another version of an electronic data cell graph (created via step 62), in which, instead of a step curve, an actual curve is used to show the comparison between an actual task profile and a planned task profile, wherein the individual sub-tasks have been stacked, but curves have been generated.

FIG. 8(I), shows another electronic data cell graph, created via step 62, in which the actual positions of late tasks (or any other area of interest) are highlighted by clicking by the manager in the profile area, and remaining tasks are thereby rendered visible. Thus, when comparing the actual task profile against the expected profile, the method and system permits identification of the specific tasks that are late and the remaining tasks, such that the project manager(s) can focus thereupon. Blocked task indicators show a problem based upon the original linking that occurred via step 54.

FIG. 8(J) shows a "z" dimension added, in accordance with another embodiment of the present invention, which enables a comparison for costing purposes, wherein completed tasks are shown with respect to the amount of the budget consumed for such completion. The "y" axis in FIG. 8(J) also has changed the "y" height of the sub-task cells to reflect the percentage of total phase time allocated or consumed, with start and end date indicators shown.

Figure 9:
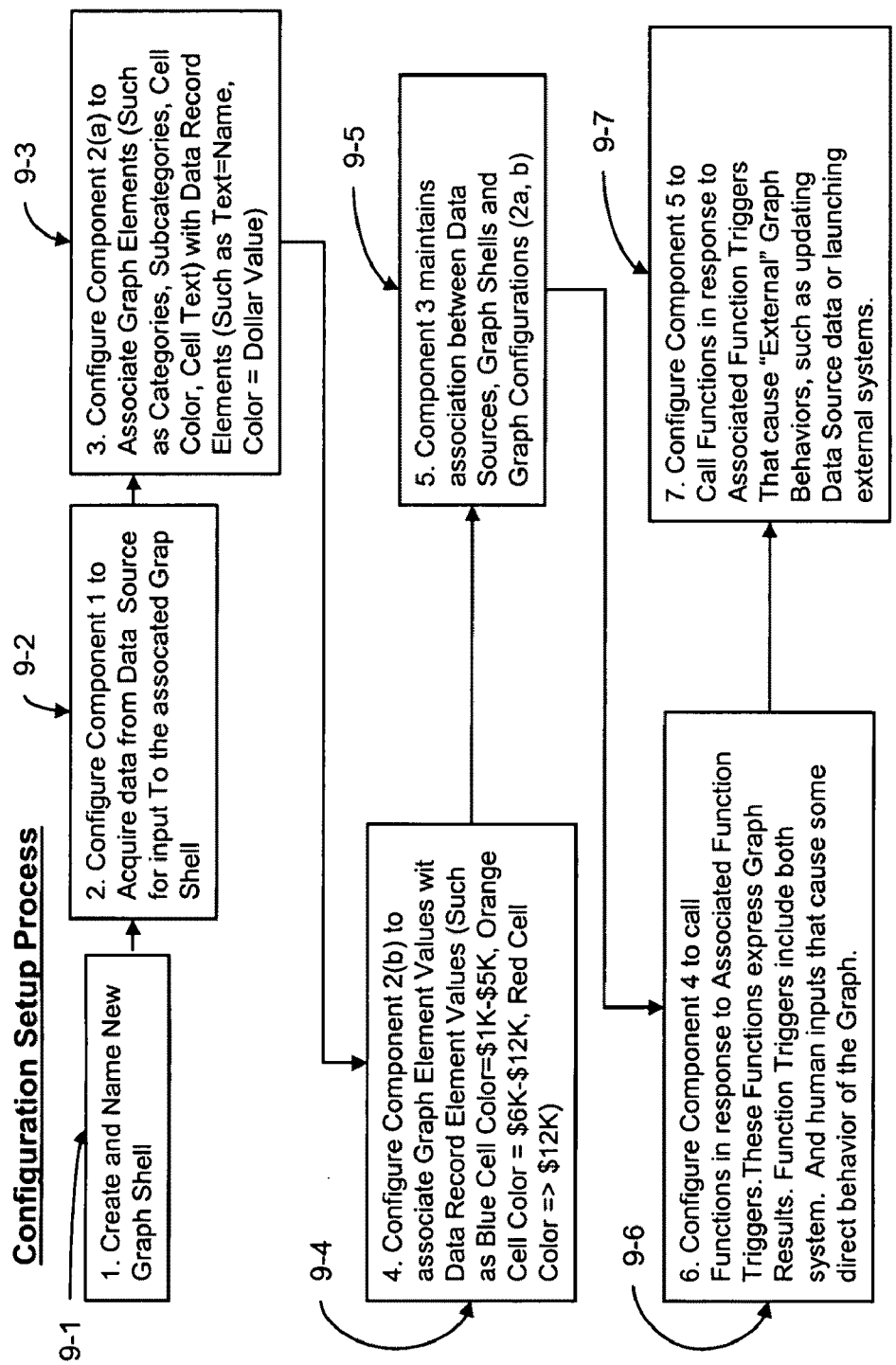
FIG. 9 is a flow chart of one embodiment of a human/computer interaction to set up or to automate a program to execute a method of the present invention

Description of FIG. 9

FIG. 9 shows a configuration setup process, in flow chart form, of one embodiment of a human/computer interaction to set up or to automate a program to execute a method of the present invention. The first step 9-1 is to create and name a new graph shell.

The second step 9-2 is to configure a first graph shell to acquire data from a data source for input to an associated graph shell.

The third step 9-3 is to configure a second graph shell to associate graph elements with data record elements. Non-limiting examples of such associate graph elements include categories, subcategories, cell color, cell text, etc Non-limiting examples of such data record elements include text=name color=dollar value, etc.

The fourth step 9-4 is to configure a third graph shell to associate graph elements values with data record element values. Non-limiting examples of such values include blue cell color=$1K-$5 K, orange cell color=$6K-$12 K, red cell color=>$12 K.

The fifth step 9-5 is to assure that the third graph cell maintains association between data sources, graph shells and the first and second graph configurations.

The sixth step 9-6 is to configure a fourth graph shell to cell functions in response to associated function triggers. These function triggers are programmed to express graph results. These function triggers include both system inputs and human inputs that cause some direct behavior of the graph.

The seventh step 9-7 is to configure a fifth graph shell to cell functions in response to associated function triggers that cause external graph behavior including but not limited to updating data source data or launching external systems.

Figure 10:
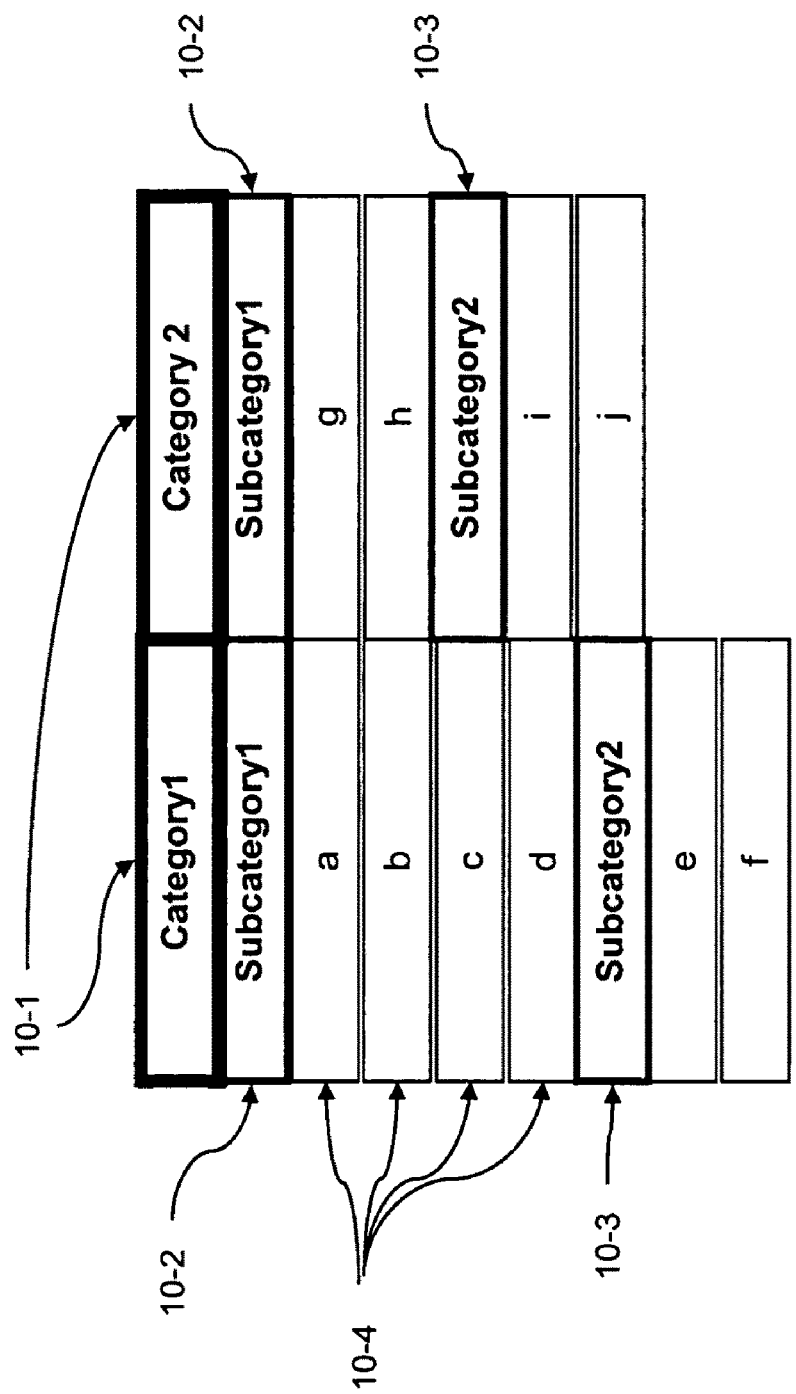
FIG. 10 is a graph configuration of one embodiment provided when carrying out one embodiment of a method of the present invention carried out by a program to execute a method of the present invention

Description of FIG. 10

FIG. 10 is a display on a computer monitor in graph configuration form of one embodiment provided when carrying out the method of the present invention by a computer program which executes a method of the present invention.

In this graph configuration, the program expresses two categories 10-1, namely category 1 and category 2 which are aligned in a horizontal row.

Stacked below category 1 is subcategory 1 10-2 whose width is identical to the width of category 1.

Stacked below subcategory 1 of category 1 is a plurality of data cells 10-4 namely a, b, c and d, which are aligned and stacked along with subcategory 1 and whose width is identical to the width of category 1.

Stacked below the plurality of data cells in subcategory 1 of category 1 namely a, b, c and d, is another subcategory, namely subcategory 2 10-3 of category 1 which also has stacked below it data cells namely e and f, which are aligned and stacked along with subcategory 2 of category 1 and whose width is identical to the width of category 1

Stacked below category 2 is subcategory 1 whose width is identical to the width of category 2.

Stacked below subcategory 1 of category 2 is a plurality of data cells namely g and h, which are aligned and are stacked along with subcategory 1 of category 2 and whose width is identical to the width of category 1 of category 2.

Stacked below the plurality of data cells of subcategory 1 of category 2 namely g, and h, is another subcategory, namely subcategory 2 of category 2 which also has stacked below it data cells namely i and j, which are aligned and stacked along with subcategory 2 and whose width is identical to the width of category 1

The behavior as programmed by execution of the computer program is that the stacks continue to grow vertically in categories and subcategories and subcategory cells which are equal in width to one category cell.

While the various cells, namely subcategory cells and data cells have been shown to be stacked top down, the method can be programmed to stack the various cells in any orthogonal manner, i.e., bottom up or sideways.

Figure 11:
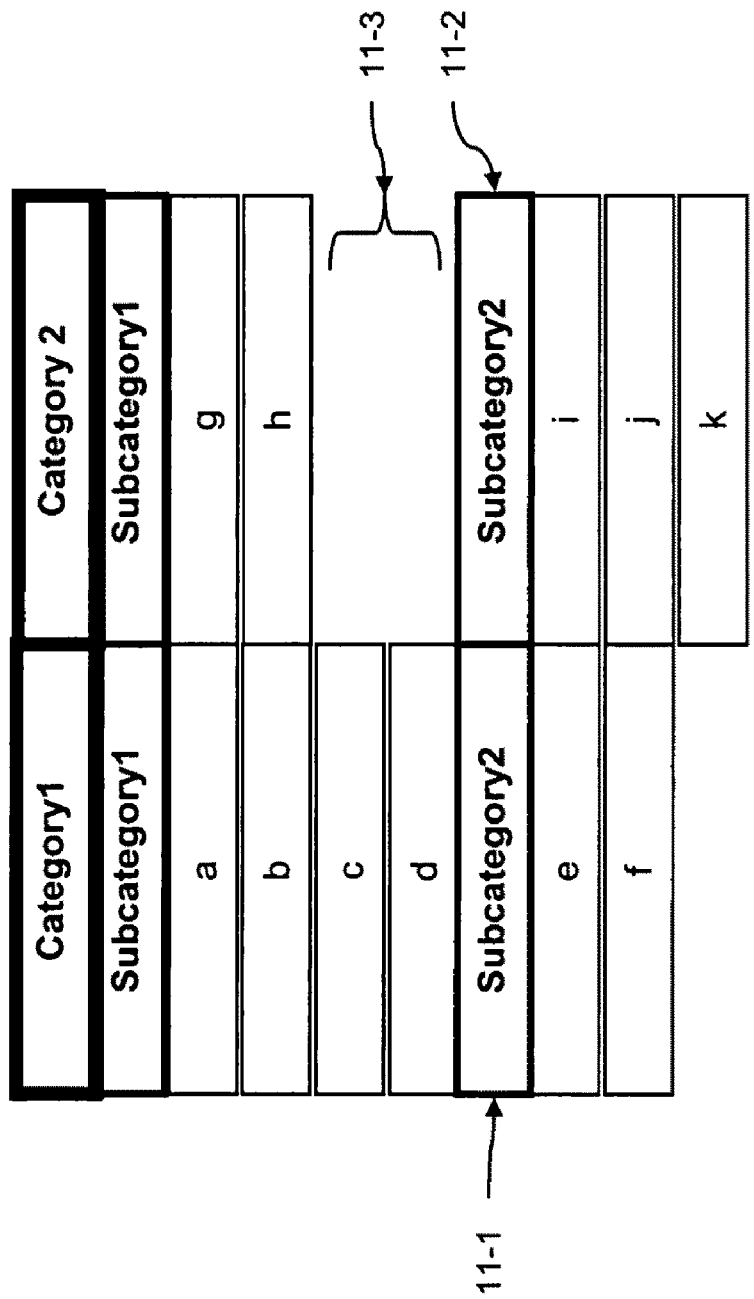
FIG. 11 is a graph configuration of another embodiment provided when carrying out another embodiment of a method of the present invention carried out by a program to execute a method of the present invention

Description of FIG. 11

FIG. 11 is a display on a computer monitor in graph configuration form of a second embodiment provided when carrying out the method of the present invention by a computer program which executes a method of the present invention.

In this graph configuration, the program expresses two categories, namely category 1 and category 2 which are aligned in a horizontal row.

Stacked below category 1 is subcategory 1 whose width is identical to the width of category 1.

Stacked below subcategory 1 of category 1 is a plurality of data cells namely a, b, c and d, which are aligned and stacked below subcategory 1 of category 1 and whose width is identical to the width of category 1.

Stacked below the plurality of data cells in subcategory 1 of category 1 namely a, b, c and d, is another subcategory, namely subcategory 2 11-1 of category 1 which also has stacked below it data cells namely e and f, which are aligned and stacked below subcategory 2 of category 1 and whose width is identical to the width of category 1

Stacked below category 2 is subcategory 1 whose width is identical to the width of category 2.

Stacked below subcategory 1 of category 2 is a plurality of data cells namely g and h, which are aligned and stacked below subcategory 1 of category 2 and whose width is identical to the width of category 1 of category 2. It is noted that there is a blank space 11-3 below data cell h for a purpose to be explained hereinafter.

Stacked below the blank space below data cell h is subcategory 2 11-2 of category 2 and which is at the same horizontal level as subcategory 2 of category 1.

Stacked below subcategory 2 of category 2 is a plurality of data cells namely "i," "j" and "k", which are aligned and stacked along with subcategory 2 and whose width is identical to the width of category 1

The behavior as programmed by execution of the program is that the stacks continue to grow vertically in categories and subcategories and subcategory cells which are equal in width to one category cell. In addition, after the data is entered the program automatically gives their values in categories based on the variable with which it is associated, in subcategories data cells etc. The system automatically finds all possible variables of data and maps it to a desired configuration of categories, subcategories and cell components. Since the subcategories are horizontally aligned and since such subcategories are also aligned with one another drag/dropping of subcategories and data cells is facilitated.

While the various cells, namely subcategory cells and data cells have been shown to be stacked top down, the method can be programmed to stack the various cells in any orthogonal manner, i.e., bottom up or sideways.

Figure 12:
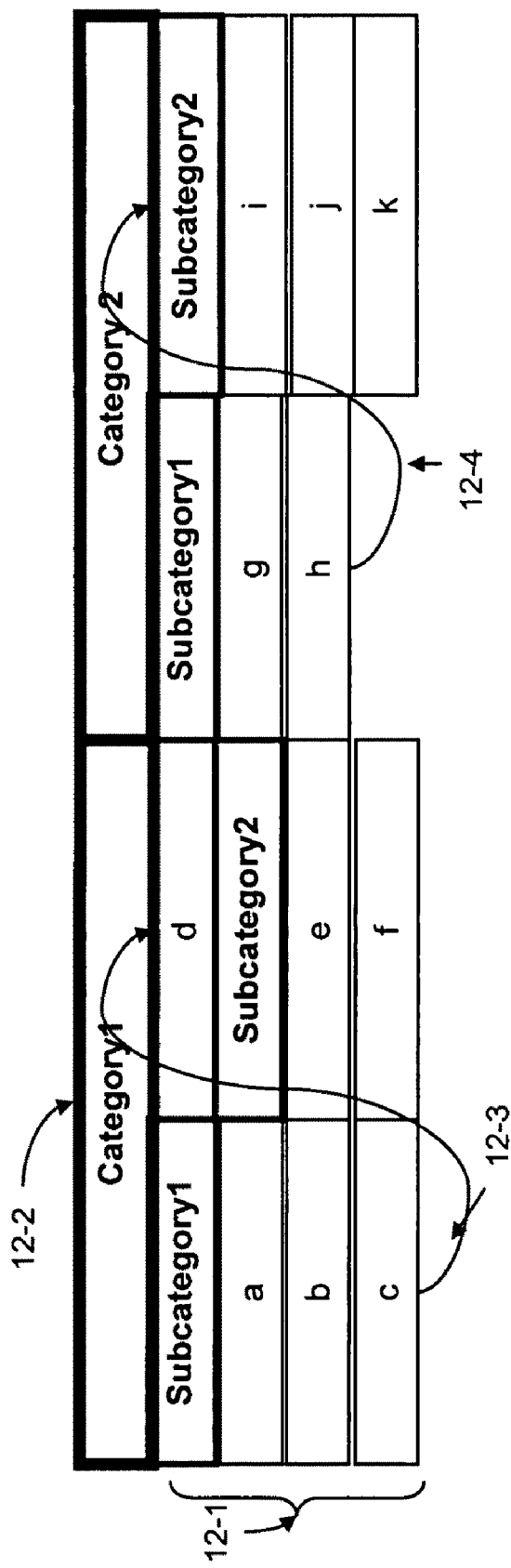
FIG. 12 is a graph configuration of another embodiment provided when carrying out another embodiment of a method of the present invention carried out by a program to execute a method of the present invention

Description of FIG. 12

FIG. 12 is a display on a computer monitor in graph configuration form of a third embodiment provided when carrying out the method of the present invention by a computer program which executes a method of the present invention.

In this graph configuration, the program expresses two categories, namely category 1 12-2 and category 2 which are aligned in a horizontal row.

Stacked below category 1 is subcategory 1 whose width one half of the width of category 1.

Stacked below subcategory 1 of category 1 is a plurality of data cells namely "a", "b", and "c", which are aligned and stacked below subcategory 1 of category 1 and whose width is identical to the width of category 1. Here, the stack of subcategory 1 and the plurality of data cells "a", "b", "c", and "d" is labeled 12-1. However the program specifies a maximum stacking height. Consequently data cell "d" has been automatically snaked over 12-1 to a position on the same horizontal level as subcategory 1 of category 1 whose width is identical to the width of subcategory 1 of category 1.

Stacked below data cell "d" is a new subcategory, namely subcategory 2 of category 1 whose width is identical to the width of subcategory 1 of category 1. Thus each of subcategory 1 of category 1 and subcategory 2 of category 1 is of one half of the width of category 1.

Stacked below category 2 is subcategory 1 whose width is one half of the width of category 2.

Stacked below subcategory 1 of category 2 is a plurality of data cells namely "g" and "h", which are aligned and whose width is identical to the width of subcategory 1 of category 2. However the program specifies a maximum stacking height. Consequently the empty space below data cell "h" has been automatically snaked over 12-4 to become subcategory 2 of category 2 at a position on the same horizontal level as subcategory 1 of category 2. Thus each of subcategory 1 of category 2 and subcategory 2 of category 2 is of one half of the width of category 2

The behavior as programmed by execution of the program is that the stacks continue to grow vertically in categories and subcategories and subcategory cells which are limited in height by the computer program. Once the subcategory is the last aligned subcategory it is moved in a snaked manner to the top of the next subcategory.

While the various cells, namely subcategory cells and data cells have been shown to be stacked top down, the method can be programmed to stack the various cells in any orthogonal manner, i.e., bottom up or sideways.

Figure 13:
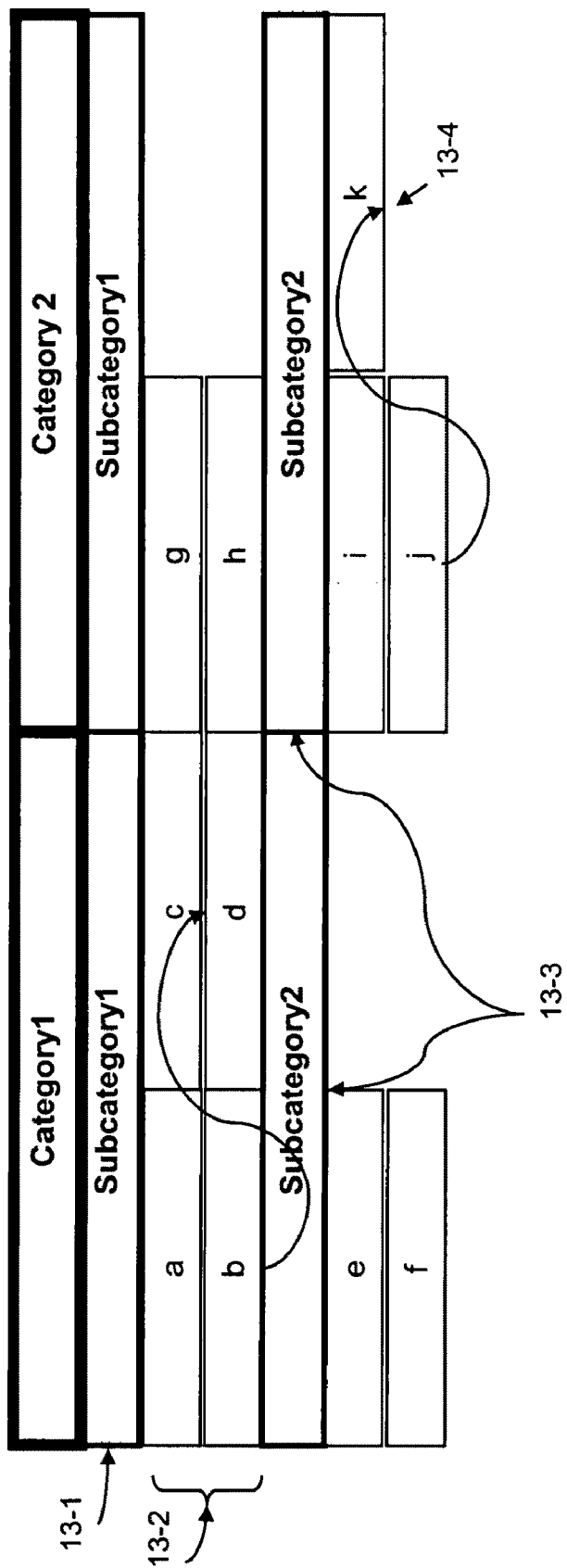
FIG. 13 is a graph configuration of another embodiment provided when carrying out another embodiment of a method of the present invention carried out by a program to execute a method of the present invention

Description of FIG. 13

FIG. 13 is a display on a computer monitor in graph configuration form of a fourth embodiment provided when carrying out the method of the present invention by a computer program which executes a method of the present invention.

In this graph configuration, the program expresses two categories, namely category 1 and category 2 which are aligned in a horizontal row.

Stacked below category 1 is subcategory 1 13-1 whose width the same width as category 1.

Stacked below subcategory 1 of category 1 is a plurality of data cells namely a and b which are aligned and stacked below subcategory 1 of category 1 and whose width is one half of the width of subcategory 1. However the program specifies a maximum stacking height. Consequently data cells c and d have been automatically snaked over 13-2 to a position on the same horizontal level as data cells "a" and "b", respectively.

Stacked below data cells "b" and "d" is a new subcategory, namely subcategory 2 13-3 of category 1 whose width is identical to the width of subcategory 1 of category 1.

Stacked below category 2 is subcategory 1 whose width is the same width as the width of category 2.

Stacked below subcategory 1 of category 2 is a plurality of data cells namely g and h, which are aligned and whose width is one half of the width of subcategory 1 of category 2. However the program specifies a maximum stacking height. Consequently the empty space is provided subcategory 2 of category 1 to enable automatic snaking of further data cells (not shown) into further data cells below subcategory 1 of category 2.

Stacked below data cells "g" and "h" is subcategory 2 of category 2 which has been described hereinabove.

Stacked below subcategory 2 of category 2 are data cells "i" and "j" whose width is one half of the width of subcategory 2 of category 2. However the program specifies a maximum stacking height. Consequently data cell k has been automatically snaked over 13-4 to a position on the same horizontal level as data cells "i" below subcategory 2 of category 2.

The behavior as programmed by execution of the program is that the stacks continue to grow vertically in categories and subcategories and subcategory cells which are limited in height by the computer program. Once the subcategory is the last aligned subcategory it is moved a snaked manner to the top of the next subcategory.

While the various cells, namely subcategory cells and data cells have been shown to be stacked top down, the method can be programmed to stack the various cells in any orthogonal manner, i.e., bottom up or sideways.

Figure 14:
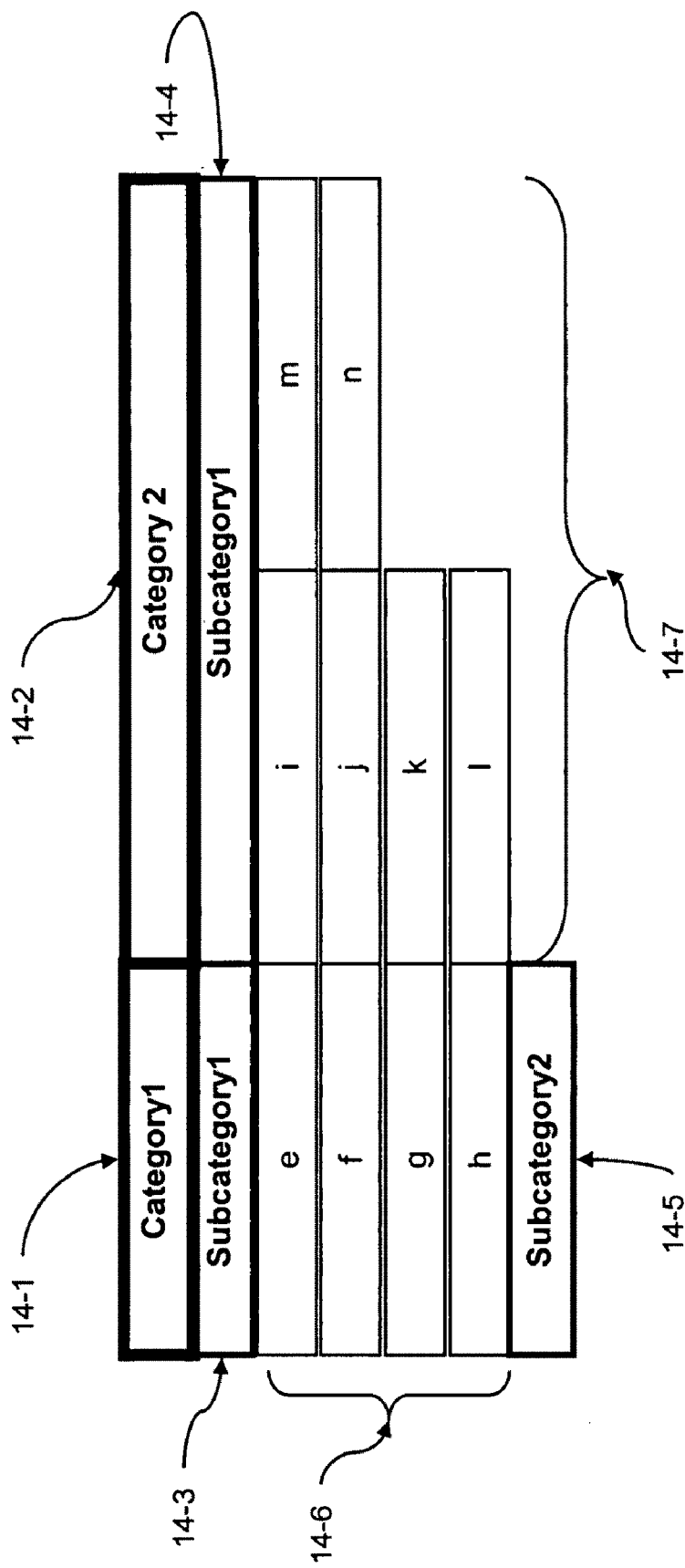
FIG. 14 is a graph configuration of another embodiment provided when carrying out another embodiment of a method of the present invention carried out by a program to execute a method of the present invention

Description of FIG. 14

FIG. 14 is a display on a computer monitor in graph configuration form of a fifth embodiment provided when carrying out the method of the present invention by a computer program which executes a method of the present invention.

In this graph configuration, the program expresses two categories, namely category 1 14-1 and category 2 14-2 which are aligned in a horizontal row.

Stacked below subcategory 1 of category 1 is a plurality of data cells namely "e", "f", "g", and "h" which are aligned and stacked below subcategory 1 of category 1 and whose width is the same as the width of subcategory 1 of category 1. However the program specifies a maximum stacking height.

Thus, stacked below data cells "e", "f", "g", and "h" 14-6 is a new subcategory, namely subcategory 2 14-5 of category 1 whose width is identical to the width of subcategory 1 of category 1. As shown, there are no data cells stacked below subcategory 2 of category 1.

Category 2 which is on the same horizontal level as category 1 is, however twice the width along the horizontal axis Stacked below category 2 is subcategory 1 14-4 whose width is the same width as the width of category 2.

Stacked below subcategory 1 of category 2 is a plurality of data cells namely "i", "j", "k", and "l" and whose width is one half of the width of subcategory 1 of category 2. However the program specifies a maximum stacking height. Consequently, further data cells "m" and "n" have been automatically snaked over as further data cells below subcategory 1 of category 2. the plurality of data cells "I", "j", "k", "l", "m", and "n" are labeled in FIG. 14 as 14-7.

The behavior as programmed by execution of the program is that the stacks continue to grow vertically in category cells, subcategory cells and data cells which are limited in height by the computer program. Once the subcategory is the last aligned subcategory it is moved a snaked manner to the top of the next subcategory. However data cells to be stacked under category 1 are automatically stacked below subcategory 2 to the height limitation. Category 2 is programmed to grow along the horizontal axis to accommodate more than one parallel stack of rows of data cells.

While the various cells, namely subcategory cells and data cells have been shown to be stacked top down, the method can be programmed to stack the various cells in any orthogonal manner, i.e., bottom up or sideways.

Figure 15:
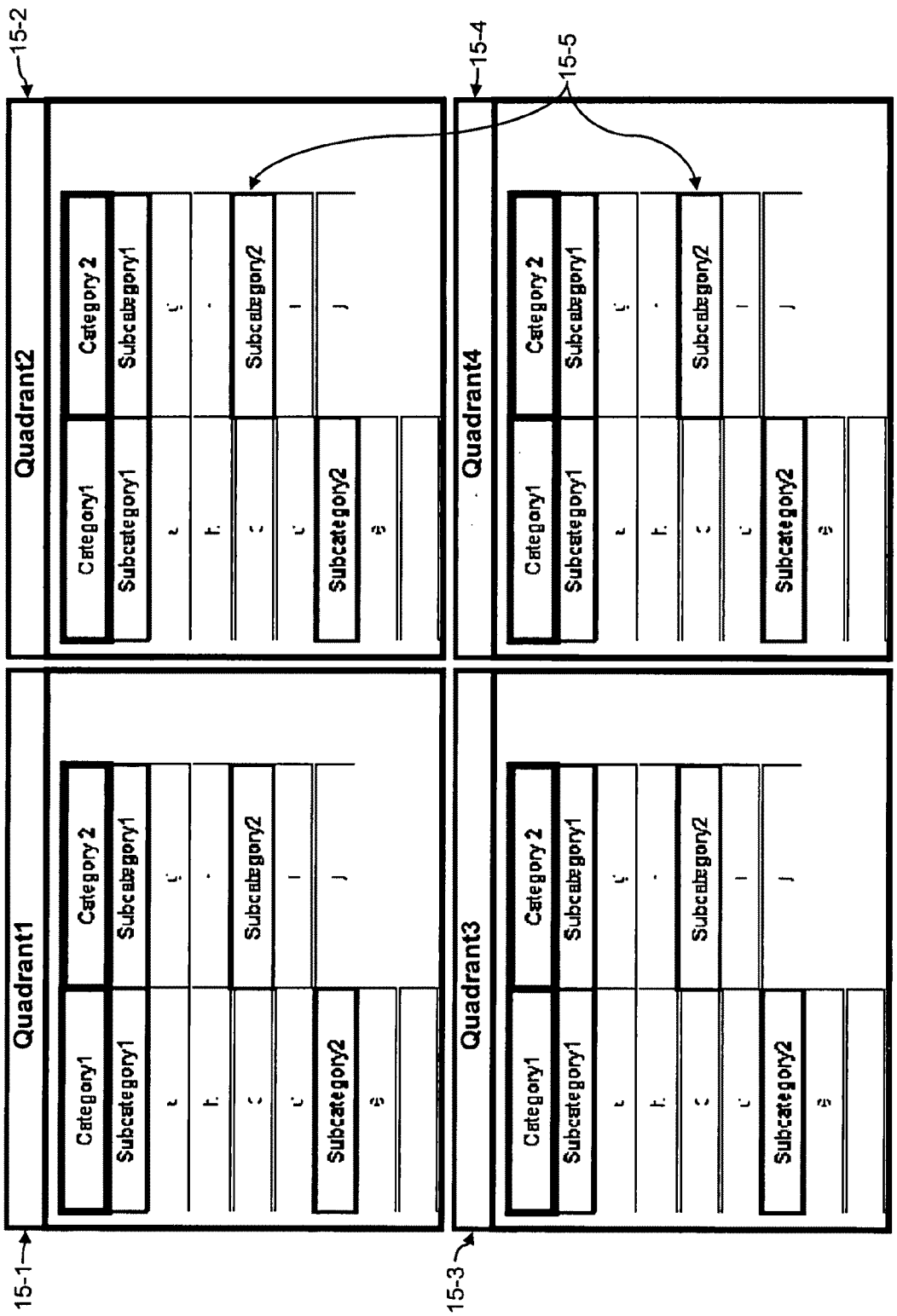
FIG. 15 is a mapped quadrant showing four graph configurations of other embodiments provided when carrying out other embodiments of a method of the present invention carried out by a program to execute a method of the present invention

Description of FIG. 15

FIG. 15 is a mapped quadrant showing four graphical configurations 15-1 to 15-4 displayed on a computer monitor in graph configuration form of embodiments provided when carrying out the method of the present invention by a program which executes a method of the present invention. These graphical configurations may be any one of the graphical configurations described with respect to FIGS. 10 to 14, or may be other configurations of other embodiments provided when carrying out the method of the present invention by a program which executes a method of the present invention. A feature which is unique to the present invention is the ability to "drag" data from one 15-5 quadrant to another quadrant. In other words, the data can migrate.

Figure 16:
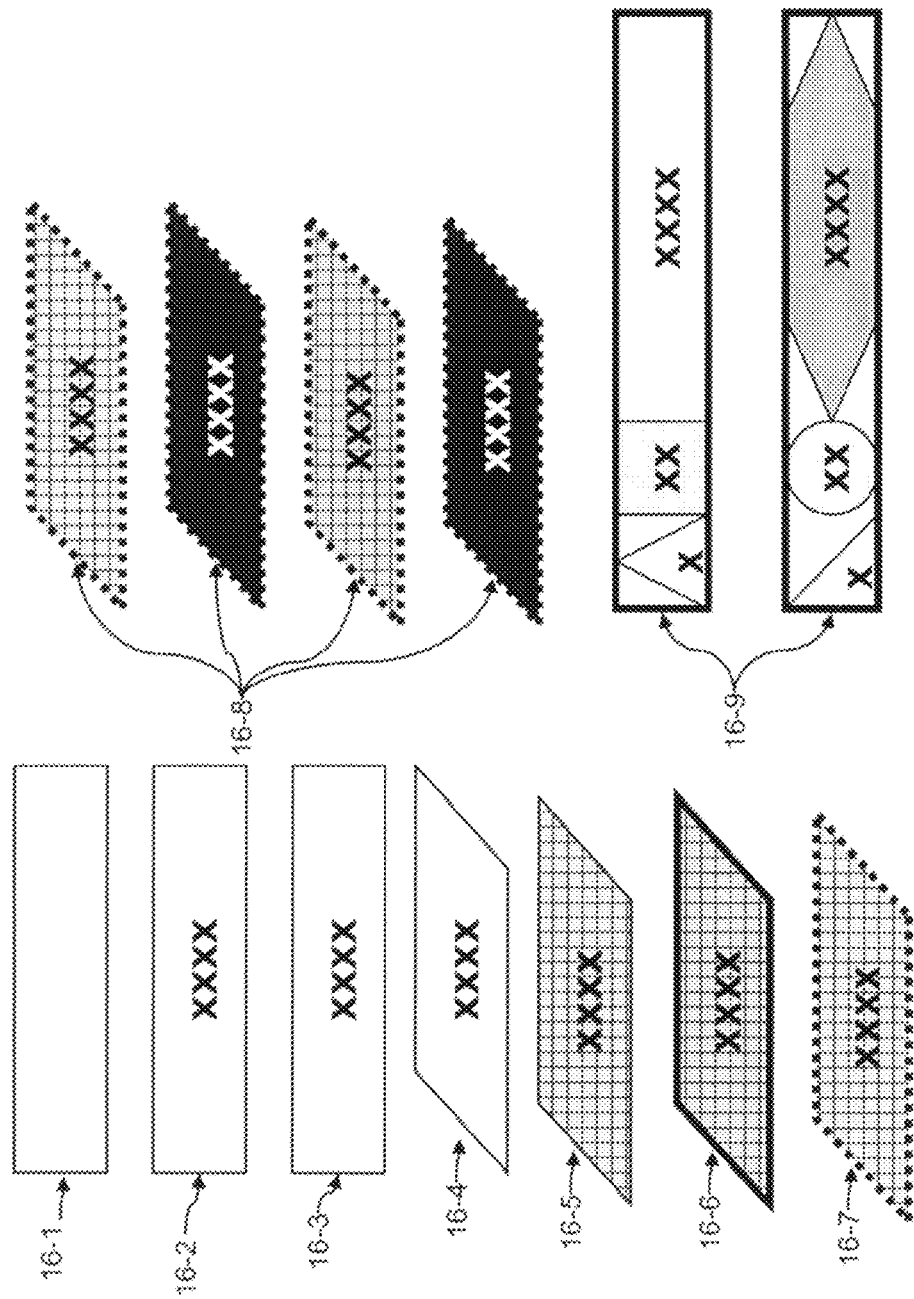
FIG. 16 is a pictorial representation of some typical graph cells

Description of FIG. 16

FIG. 16 is a pictorial representation of some typical graph cells 16-1 to 16-9. This figure shows that the steps executed by the computer program associated with the present invention continually adds more variables to be mapped into the data cell components.

Figure 17:
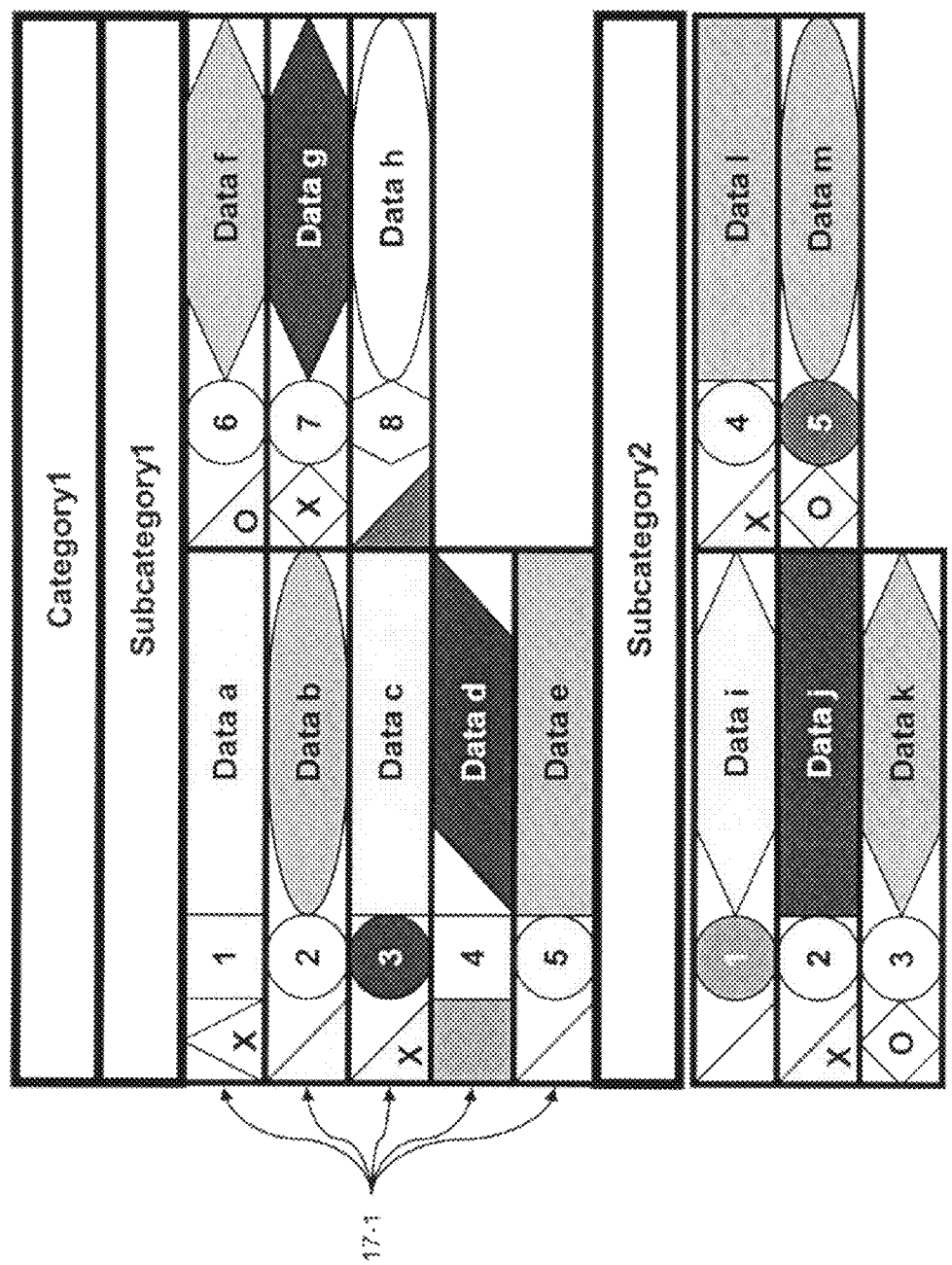
FIG. 17 is a pictorial representation of a series of some typical graph cells

Description of FIG. 17

FIG. 17 is a pictorial representation of a series of some typical graph cells 17-1. This figure shows in pictorial form one example of the display on a computer monitor in graph configuration form of one embodiment provided when carrying out the present invention by a program which executes a method of the present invention described in FIG. 10 by means of the steps executed by the computer program associated with the present invention.

Figure 18:
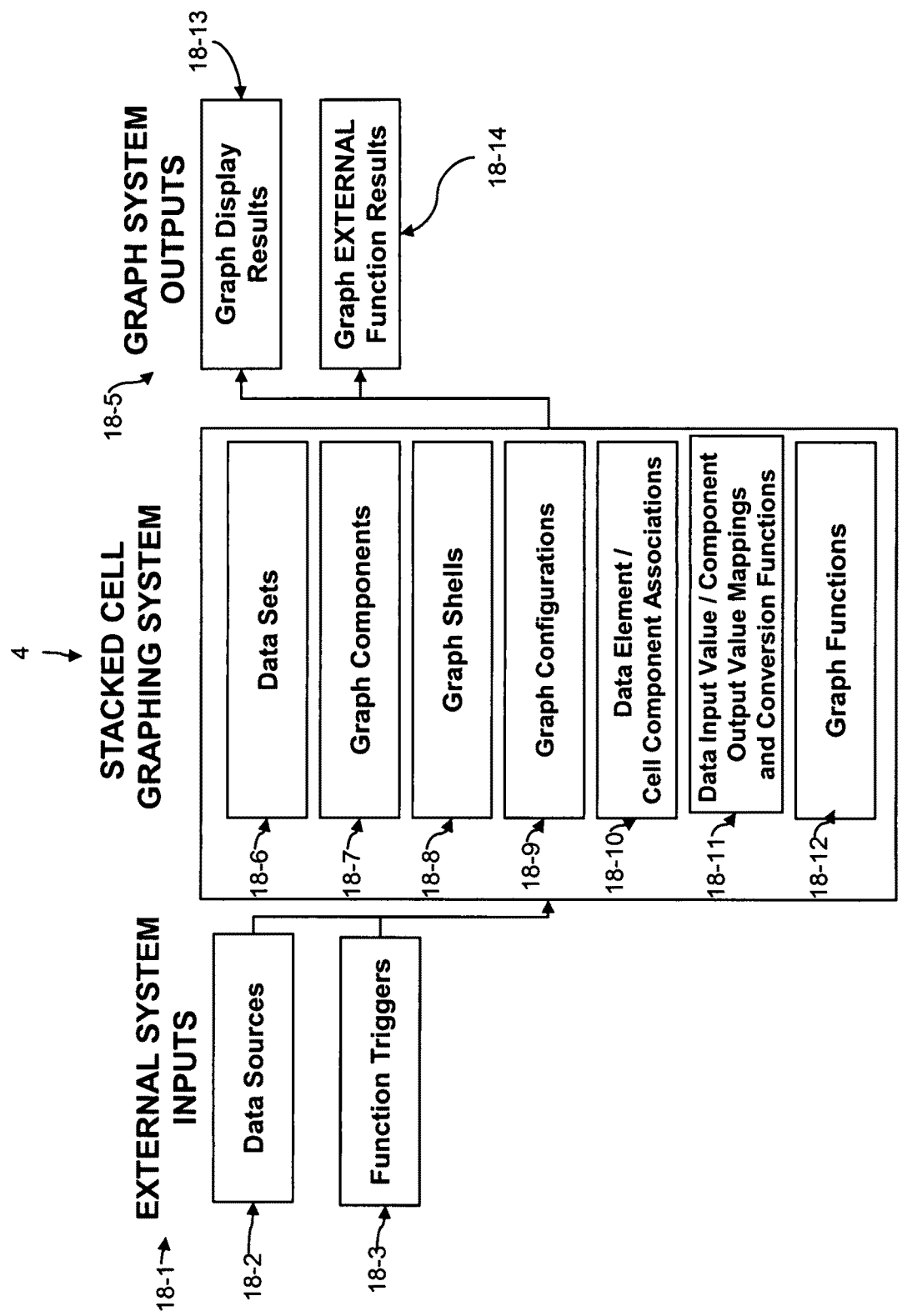
FIG. 18 is schematic representation of the construction of graph system outputs derived from external system inputs.

Description of FIG. 18

FIG. 18 is schematic representation of the construction of graph system outputs derived from external system inputs. As seen in FIG. 18, a set of external system inputs generally referred to as 18-1 is inputted into a stacked cell graphing system generally referred to as 18-2. This stacked cell graphing system 18-2 comprises a computer software program the flow chart of which will be described hereinafter. As defined hereinabove, the stacked cell graphing system 18-2 is the system that generates the "data cell graph" according to the methodology of the present invention. The system 18-2 may consist of physical components, e.g., blocks, pegs and/or magnets, as well as electronic, magnetic and/or pegged whiteboards. However, the preferred embodiment involves a computer software code that generates the graph on a computer screen with inputs coming from various sources and where a human being may interact with the graphical objects plotted on the computer screen.

DATA CELL GRAPH: The physical embodiment of the current invention, heretofore referred to as the "graph", that represents a novel method of visually organizing and prioritizing information in the form of physical or graphical objects. The objects are plotted in vertical or horizontal stacks according to specific sequencing and categorization rules. The graph may be "interactive", meaning that a human being can physically manipulate objects plotted on the graph. While the graph may consist of physical objects like blocks and magnets on a board, the preferred embodiment is a graph generated by a computer program and displayed on a screen (computer screen, electronic whiteboard, handheld screen or other), the objects being graphical and the human being can therefore pass a computer mouse pointer or other object over the graph and its objects to perform various functions related to them.

The external data sources 18-2 comprise information that is acquired by the "graph system" from any number or combinations of databases, software functions or applications, data tables, data files, voice mails, human real-time data entry or other possible means of providing information to the "graph system" for "graph" behavior output processing.

The external function triggers 18-3 are programmed to express graph results. These function triggers include both system inputs and human inputs that cause some direct behavior of the graph including but not limited to updating data source data or launching external systems.

The stacked cell graphing system 18-4 includes, in its software program, instructions to express graph data sets 18-6, graph components 18-7, graph shells 18-8, graph configurations 18-9, data element/cell component associations 18-10, data input value/component output value mappings and conversion functions 18-11 and graph functions 18-12.

The graph data sets 18-6 comprise information from one or more different types of data sources that may be combined and appropriately reformatted, translated and re-configured by the "graph system" to create information sets that contain sufficient information to produce the outputs to the "graph system"

The graph components 18-7 are the various interactive and/or structural components that, together, form all physical elements of the graph as are contained within each graph shell. Graph components thus include the physical graphing elements described herein, e.g., quadrant cells, category cells, subcategory cells, data cells and the various cell components that comprise the data cells.

The graph shells 18-8 comprise a dedicated graph plotting area that applies the currently active graph configuration to the associated graph data set. One graph shell may apply one or many different graph configurations to the same data set. When a system user activates a particular graph configuration, the graph shell plots the graph according to the cell component mappings of the selected configuration. Hence, in one graph configuration, "team assignment" may be mapped to the "shape 1" data cell component and in another graph configuration, "team assignment" may be mapped to the "color of shape 1" data cell component. Hence, several different graph configurations can be applied to the same graph data set within a graph shell to slice, splice the data in different ways.

The graph configurations 18-9 are the definitions of parameters that define all the graph appearances, functions and behaviors. A given graph configuration may include, for example, the choice of cell components to be included in a graph shell, the cell component mappings for category cells, subcategory cells and data cells, the total number of cells to be populated per graph shell page view before going to the next page, the height and width of a graph shell, the size of the cells, the choice of including quadrant cells and other graph components or behaviors The data element/cell component associations 18-10, are the "one-to one" or the "one: to many" associations between various types of data to the various types of cell components for a single record which may be either auto-generated, or human defined For example, consider a single record in the graph data set that includes three fields of data, data_field 1, data_field 2, data_field 3. These may be associated with the following: data cell_component 1, data cell_component 2 and data cell_component 3 respectively.

The data input value/component output value mappings and conversion functions 18-11 are elements of a data set that, together, comprise all possible types of inputs to a data record to be converted through some functions and rules into the outputs of a cell body. For example, data set A={data_element 1, data element 2, data_element 3 . . . data_element "n"} They also are the relationships between data values and cell component values which may be either auto-generated, or human pre-defined that inform the graph system on how to translate the input data into visual or functional graph outputs. There are three types of cell component mappings, namely: (1) data variables mapped to quadrants, category cells and subcategory cells; (2) data variables mapped to cell component types; and (3) data values mapped to cell component values. These require three types of associations. The first association is between the cell component and the specific data source variable that it represents. For example, the cell component "shape1" may be associated with the data source variable "team assignment". The second cell component mapping is a one to one or many to one mapping of data source variable values to given cell component values. For example, the possible "team assignment" values may include "team1, team 2, and team 3". The possible "shape1" values may include "rectangle, hexagon, oval etc". Hence, the data source value to cell component value mapping result could appear as follows: "team1=rectangle, team 2=hexagon, and team 3=oval". The third cell component mapping is between the given cell body and its related cell bodies that indicate either stacking position or interdependency relationships. For example, a data cell may be associated with one other subcategory cells, category ells and quadrant. Together, these associations will indicate where the data cell should be stacked. The data cell may also be related to one or many other data cells that would indicate its sequencing position or any external functions or behaviors that are exhibited due to interdependencies between two or more Data Cells.

Figure 20:
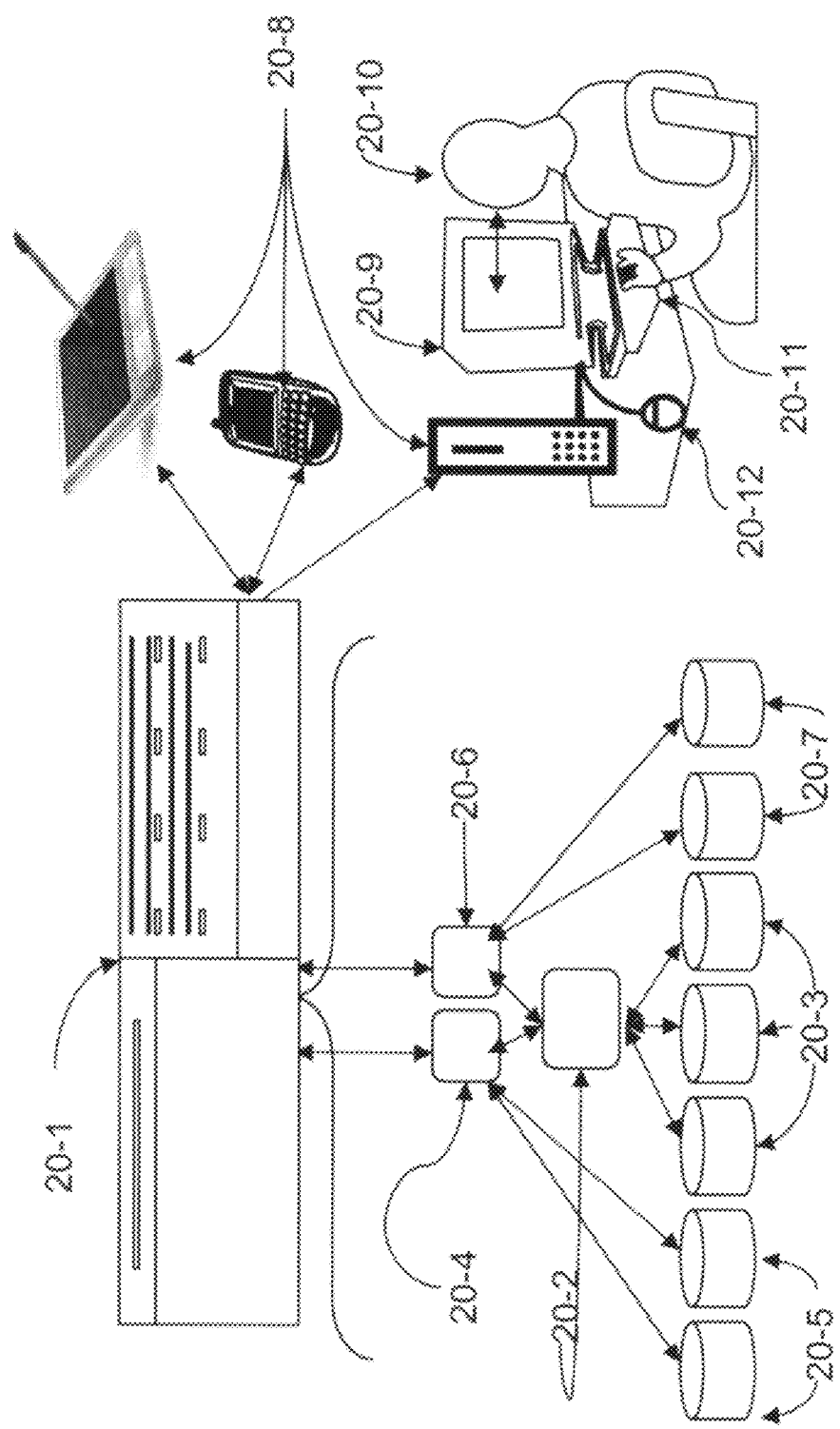
FIG. 20 is a three-dimensional idealistic representation of the manner of inputting and retrieving data in a method of the present invention.

The graph functions 18-12 are functional characteristics enabling the exhibiting of specific behaviors, given specific inputs, constraints and conditions to the associated functions. Specifically, FIG. 20 is one possible hardware/software configuration of the present invention. Specifically, 20-1 represents at least one application server containing software code to process and convert system inputs into outputs. 20-1 also comprises at least one database server. 20-4 represents software code to communicate with the database server. 20-6 represents software code to communicate with the application server. 20-2 represents at least one application to interact with at least one external data source. 20-3, 20-5, and 20-7 represent various types of external data sources. 20-10 to 20-12 represent possible human-computer interfaces interacting with the system. 20-8 represents computing devices that interact with the application and database servers of 20-1. 20-8 also represents, as well as 20-9, possible display media for displaying outputs from the system.

The graph system outputs 18-5 include graph display results 18-13 and graph external function results 18-14.

The graph display results 18-13 include graph data element values which are the actual set of values of a given data element for any given record in a data set. For instance, data element 1 may equal one of {data_element 1_value 1, data_element 1_value 2 . . . data_element 1_value "n".}. They also include physical cell component values which comprise the various possible values that can be expressed by a given PCC, where, for example PCC 1 may equal one of {PCC 1_value 1, PCC 1_value 2, PCC 1_value 3 . . . PCC 1 value "n".}.

The graph external function results 18-14 include functional cell components which are distinguishable functional characteristics bundled within a cell body that causes the cell body to exhibit specific behaviors, given specific inputs, constraints and conditions to the associated functions. It also includes functional cell component values which are the various possible cell body behaviors that can be expressed by a given FCC.

Figure 19:
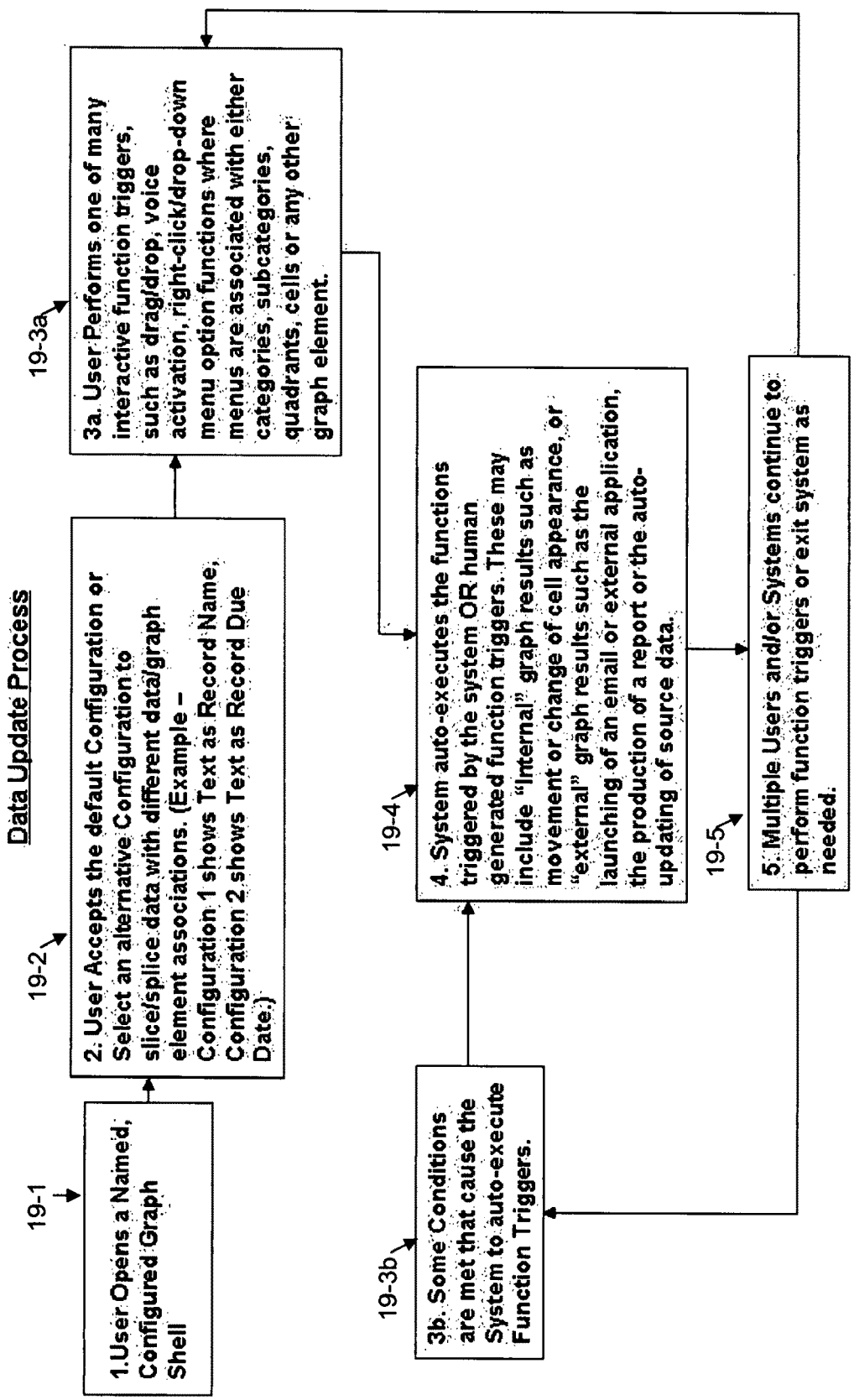
FIG. 19 is a flow chart of a data update process for updating a computer program which, when executed, carries out a method of the present invention.

Description of FIG. 19

FIG. 19 is a flow chart of a data update process for updating a computer program which, when executed, carries out a method of the present invention The first step 19-1 in this data update process comprises opening up a named, configured graph shell.

The second step 19-2 in this data update process comprises either manual acceptance by the user of the default configuration shown in the opened graph shell, or manual selection by the user of an alternative configuration to slice/splice data with different data graph element associations. For example, a first configuration may show text as a record name, while a second configuration may show text as a record due date.

The third step 19-3 in this data update process comprises performance by the user of one of many interactive function triggers. For example, such triggers may be drag/drop, voice interaction, right click/drop-down menu option functions, e.g., functions which are associated with either categories, subcategories, quadrants, data cells or any other graph element.

The fourth step 19-4 in this data update process comprises either auto-execution by the system of the functions triggered by the system, or manual generation of trigger functions. For example, these triggers may include "internal" graph results, e.g., movement or change of data cell appearance, or "external" graph results, e.g., the launching of an e-mail or an external application, the production of a regular report or the auto updating of source data.

The fifth step 19-5 in this data update process comprises continuation of the performance by the multiple users and/or the system function triggers or exit of the system as needed.

If the fifth step 19-5 in this data update process comprises continuation of the performance by the multiple users and/or the system function triggers, then the system may automatically feed back to the third step 19-3 and then to proceed again to the fourth step 19-4.

If the fifth step 19-5 in this data update process comprises continuation of the performance by the multiple users and/or the system function triggers, then the system may alternatively feed back to a sixth step 19-6 where some conditions are met which causes the system to execute function triggers automatically.

If the fifth step 19-5 in this data update process comprises continuation of the performance by the multiple users and/or the system function triggers, causes the system to feed back to a sixth step 19-6 where some conditions are met which causes the system to execute function triggers automatically, then the next step is for the system to feed back from the sixth step 19-6 to the fourth step 19-4.

Description of FIG. 20

FIG. 20 is a three-dimensional idealistic representation of the manner of inputting and retrieving data in a method of the present invention.

Figure 21:
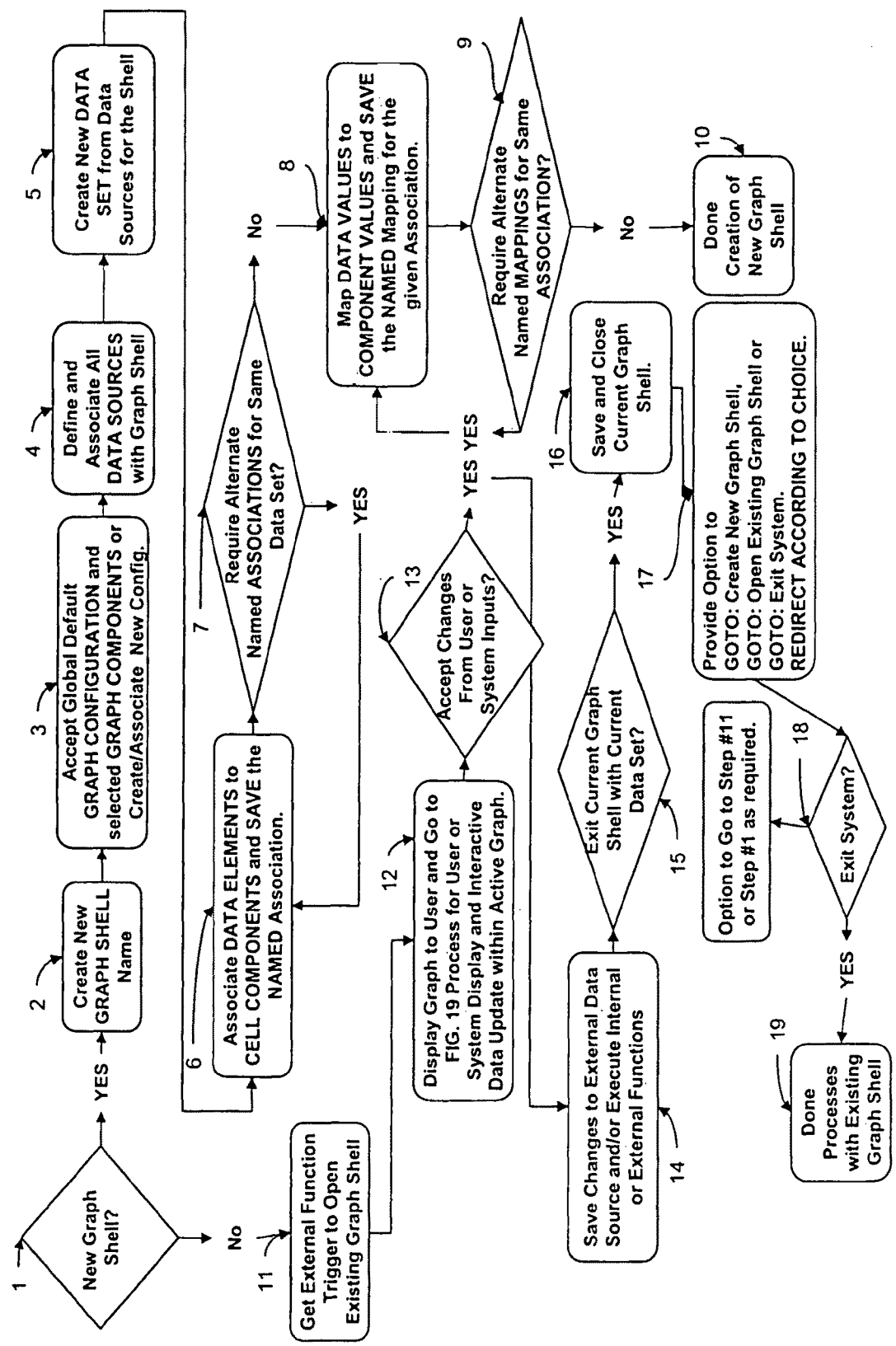
FIG. 21 is a flow chart of a computer program which, when executed, carries out a method of the present invention

Description of FIG. 21

FIG. 21 is a flow chart of a computer program which, when executed, carries out a method of the present invention. As seen in FIG. 21 the first decision step 21-1 is" "New graph shell" If the answer is "YES" then step 21-2 is "Create new graph shell name". Then step 21-3 is "Accept global default graph configuration and selected graph components or create/associate new configuration. Step 21-4 is: Define and associate all data sources with graph shell." Step 21-6 comprises "Associate data elements to cell components and save the named association."

The next decision step 21-7 is "Require alternate named associations for same data set?" If the answer is "NO" then step 21-8 is carried out to "Map data values to component values and save the named mapping for the given association"

The next decision step 21-9 is to "Require alternate named mappings for same association?" If the answer is "YES" then the system feeds data back to step 21-8. If the answer is "NO" then step 21-10 is carried out "Done creation of new graph shell".

If the answer to decision step 21-7 is "YES" then the system feeds the data to step 21-6.

If the answer to decision step 21-1 is "NO" then step 21-11 is carried out to "Get external function trigger to open existing graph shell". Step 21-12 is then carried out to "Display graph to user and go to the data update process for user or system display and interactive data update within active graph."

The next decisions step 21-13 "Accept changes from user or system inputs?" is automatically answered "YES" and the next step 21-14 is carried out to "Save changes to external data source and/or execute internal or external functions".

The next decision step 21-15 is "Exit current graph shell with current data set". The system automatically answers "YES" and step 21-16 is carried out to "Save and close current graph shell". However additional options are automatically enabled, namely "Provide option to "GOTO: o Create new graph shell"; or "GOTO: Open existing graph shell" or "GOTO: Exit system" or "Redirect according to choice". If the option is to "exit system", then decision step 21-18 "Exit system?" is asked If the answer is "YES then step 21-19 is carried out to "Done processes with existing graph shell If the answer is "NO", then the system provides two options, namely to go to step 21-11 or to go to step 21-1 as required.
Description of FIG. 22

Figure 22:
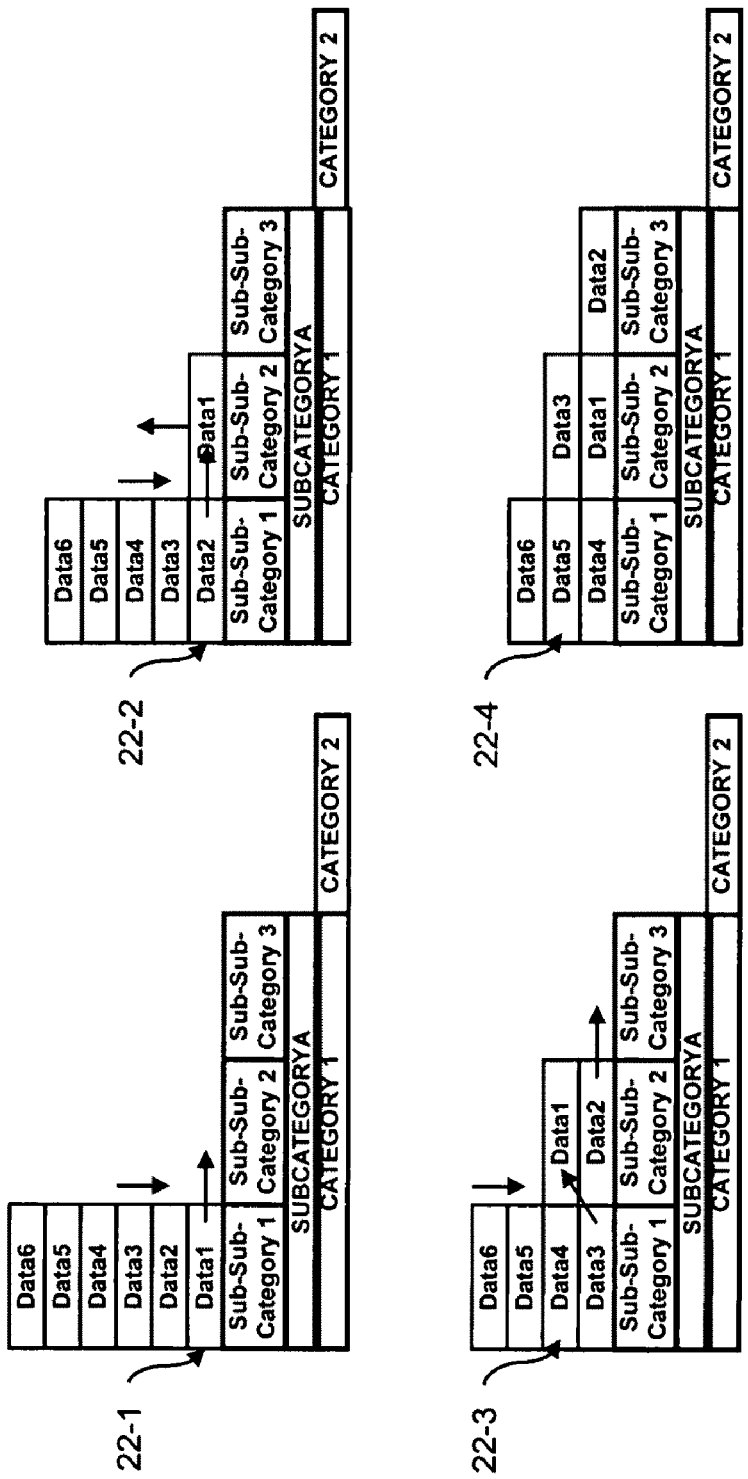
FIG. 22 is a visual representation of four snapshots in time showing one of many possible patterns of data cell movements between entity stacks corresponding to changes in attribute values associated with each separate categorized stack, within one of many possible layouts of categorical hierarchies.

FIG. 22 demonstrates the process for reporting a change in status of the "Task Cells", or more generically a change in subcategory value associated with "data cells", per one of many possible bottom up, inverted configurations and where subcategories follow the same parallel alignment as the categories, orthogonal to the axis of "data cell" stack alignment. Note that migration of the "data cells" across different subcategories and their respective sequential positioning in a stack may be driven by any number of "function triggers" input to the system such as user drag/drop and/or some auto-calculated prioritization rules.
Description of FIG. 23

Figure 23:
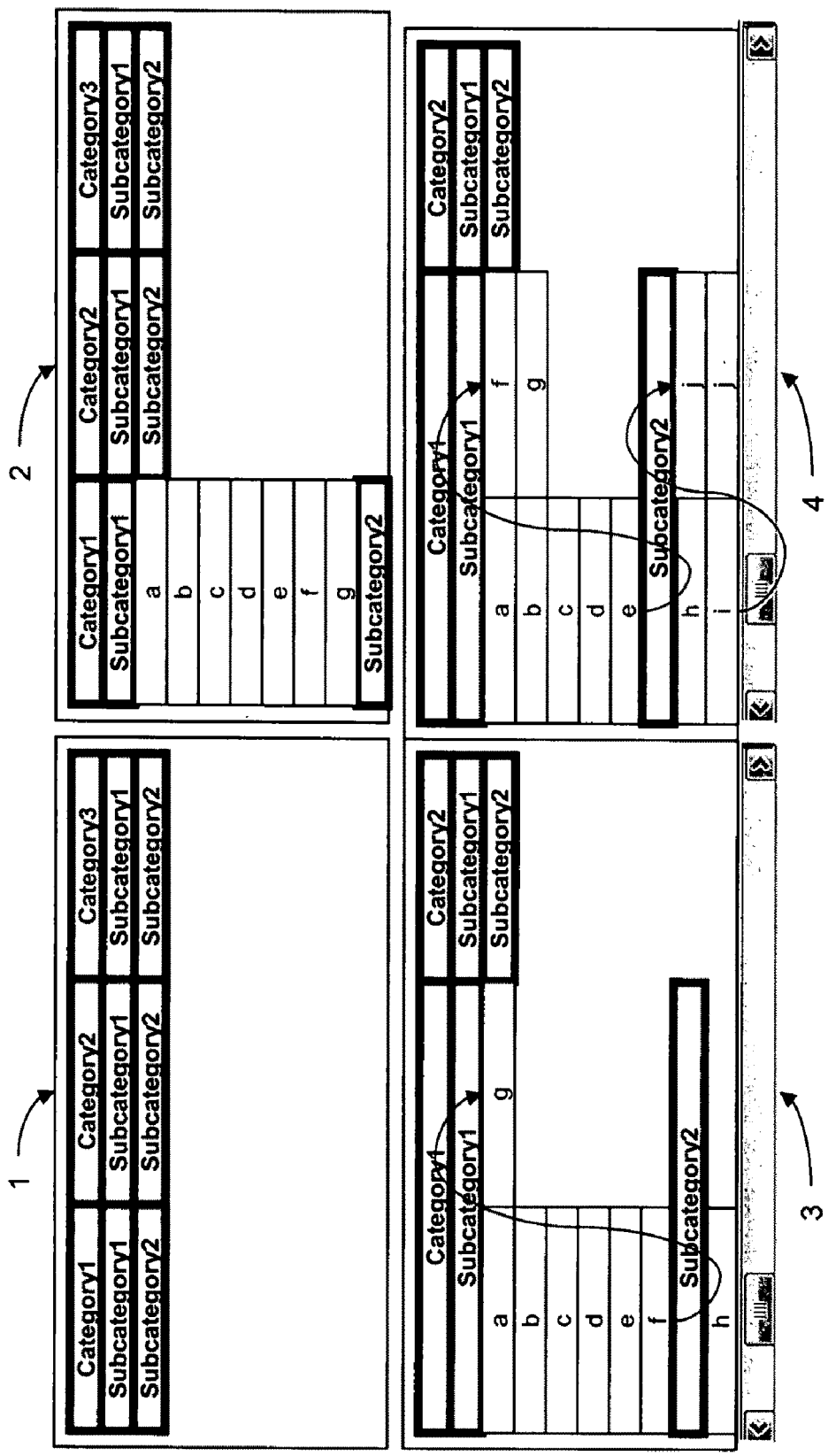
FIG. 23 is a visual representation of four snapshots in time showing stack behaviour functions accommodated by constraints for one of many possible graph configurations.
Figure 24:
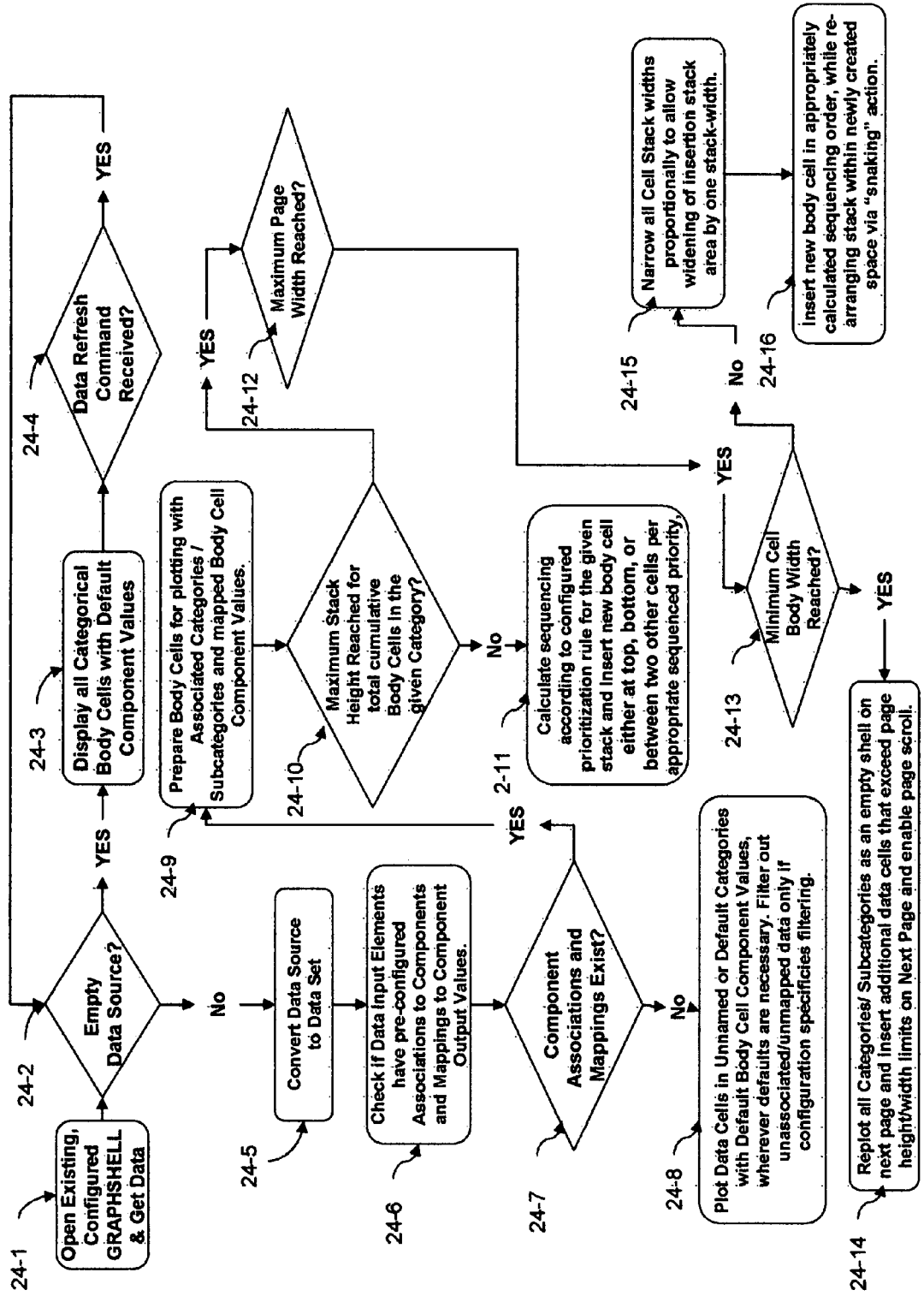
FIG. 24 is a flowchart of a computer program to execute one of many possible methods of the present invention for insertion and alignment of body cells.

FIG. 23 demonstrates the process of re-stacking, widening of categories and snaking within a category, when new "data cells" have been inserted into a given stack by some "external functions" such as drag/drop or other migration or insertion triggers. Note the auto-rearrangement of "data cells" and auto-widening of categories and subcategories to accommodate a constraint such as, in the case demonstrated, a maximum page or stack height. Note occurrence of horizontal scroll bars as necessary. FIG. 24 as described below provides an example of how the computer program rearranges the graph to accommodate a newly inserted "data cell" within a given stack.
Description of FIG. 24

FIG. 24 is a flow chart of a computer program which, when executed, carries out a method of the present invention to plot the "data cells" with the required associated "component" output appearance and within the appropriate position in alignment with the corresponding mapped category cells. The flow chart demonstrates examples of conditions where the computer program auto-executes "cell stack snaking", categorical "cell body" widening, stack sequence re-arrangements and new page creation, in order to accommodate a newly inserted "data cell" within a given stack.

Step 24-1 receives some external "function trigger" to Open an Existing, already "configured" "graph shell" and to & get the data associated with that "graph shell". Decision step 24-2 verifies asks the question if it is an "Empty Data Source?". If the answer is yes, then step 24-3 executes "Display all Categorical Body Cells with Default Component Values". An example of a default, empty data set representation can be seen in FIG. 23-1. Decision step 244 asks the question if "Data Refresh Command has been Received?" if the answer is "No" then the system does nothing, but if the answer is "Yes", then the system loops back to get the current data and ask the question 24-2 if it is an "Empty Data Source?". If the answer is "No", then the system executes the step 24-5 to "Convert Data Source to Data Set".

Step 24-6 executes the action "Check if Data Input Elements have pre-configured Associations to Components and Mappings to Component Output Values." then follows by asking the question 24-7 if "Component Associations and Mappings Exist?". If the answer is "No", then the system executes step 24-8 to "Plot Data Cells in Unnamed or Default Categories with Default Body Cell Component Values, wherever defaults are necessary." Alternatively, the system will "Filter out unassociated/unmapped data only if configuration specificies filtering," which means that if optionally required by the particular "graph shell configuration" and/or associated functions, the "unassociated" and/or "unmapped" data cells may get filtered out from the display.

If the answer to the question 24-7 is "Yes", that "component associations and mappings" do exist, then the next step 24-9, "Prepare Body Cells for plotting with Associated Categories/Subcategories and mapped Body Cell Component Values" ensures the system has all the required conversion specifics that transform data inputs into visual outputs for the given "data cell" to be inserted and plotted within a given stack.

Prior to plotting the "data cell", the system must ask the question 24-10 of the destination stack if "Maximum Stack Height Reached for total cumulative Body Cells in the given Category?". If the answer is "No", then the system performs a function and sequencing constraint-driven insertion step number 24-11 to "Calculate sequencing according to configured prioritization rule for the given stack and Insert new body cell either at top, bottom, or between two other cells per appropriate sequenced priority."

If the answer to question 24-10 "Maximum Stack Height Reached" is "Yes" plus the answer to 24-12 "Maximum Page Width Reached?" is "Yes", and the answer to 24-13 "Minimum Cell Body Width Reached?" is also "Yes", then the current plotting page area for the "graph shell" has effectively run out of space for adding any new "data cells". Hence, the system will automatically perform the step 24-14 "Replot all Categories/Subcategories as an empty shell on next page and insert additional data cells that exceed page height/width limits on Next Page and enable page scroll."

Alternatively, if the answer to 24-13 "Minimum Cell Body Width Reached?" is "No", then this means that it is possible to squeeze in an additional category within the existing "graph shell" plotting area page width. Hence, the system performs step 24-15 to "Narrow all Cell Stack widths proportionally to allow widening of insertion stack area by one stack-width," automatically followed by the step 24-16 to "Insert new body cell in appropriately calculated sequencing order, while re arranging stack within newly created space via "snaking" action."

CONCLUSION

The foregoing has constituted a description of specific embodiments showing how the invention may be applied and put into use. These embodiments are only exemplary. The invention in its broadest and more specific aspects is further described and defined in the claims which follow.

These claims, and the language used therein are to be understood in terms of the variants of the invention which have been described They are not to be restricted to such variants, but are to be read as covering the full scope of the invention as is implicit within the invention and the disclosure that has been provided herein.

The invention claimed is:

1. An electronic method of representing changes and associations of a plurality of entity instances, comprising:
   a. representing each of said plurality of entity instances as a separate cell body comprising a plurality of cell components, wherein a particular cell body is identifiable as representing a particular entity instance of the plurality of entity instances;
   b. ensuring that the plurality of cell components comprise physical, functional and content cell component types;
   c. associating each of said entity instances with at least two attributes;
   d. assigning at least one of the at least two attributes one of at least two possible mutually exclusive attribute values;
   e. for each cell component of the plurality of cell components:
      i. defining, on a computer, at least one possible attribute to cell component association;
      ii. designating, on the computer, one of the possible attribute to cell component associations as a currently active association for the cell component;
      iii. permitting the cell component to be assigned one of at least two mutually exclusive cell component values;
      iv. permitting, on the computer, at least one possible input/output value mapping of said attribute value to said cell component value to be assigned for each of said attribute to cell component associations; and
      v. permitting, on the computer, a change in at least one attribute value associated with the at least one possible input/output value mapping;
   f. arranging the cell bodies in one or more entity stacks, each stack associated with an attribute value category of a plurality of attribute value categories at an initial time T1, such that each attribute value category is associated with zero or more entity stacks, depending on the presence or absence of cell bodies associated with each said attribute value category at said initial time T1;
   g. using the computer, generating and displaying a configuration representing the plurality of entity instances and their respective attribute values as their separate cell bodies comprising the plurality of cell components and said cell component values respective to said currently active attribute association and the input/output value mapping, wherein the cell bodies are stacked according to said current attribute to category association, wherein the configuration is capable of being switched according to at least one different value mapping, attribute to cell component association, or attribute value category;
   h. moving, using the computer, at least one cell body of said cell bodies from its association with one stack, of the one or more entity stacks, to another of said entity stacks, either before or after a change in the attribute value associated with the entity instance represented by said moved cell body; and
   i. associating patterns, trends, changes or anomalies of at least one attribute value with patterns, trends, changes or anomalies of the separate cell bodies.

2. The method of claim 1, comprising the additional steps of:
   j. determining a hierarchical breakdown structure of selected attribute values one or more level deep, wherein each of said one or more levels categorizes the mutually exclusive attribute values, such that a first hierarchical level categorizes a first attribute's values and any deeper levels in the hierarchy sub-categorize values of additional attributes; and
   k. reserving a hierarchical breakdown structure of the cell bodies corresponding to the said breakdown structure of the selected attribute values in order to provide placement indicators for stacking lowest level cell bodies of the separate cell bodies corresponding to their respective attribute values.

3. The method of claim 2, comprising the additional step of:
   l. closing any gap in the one or more entity stacks resulting from said moving step, thereby representing overall entity instance attribute value changes from one attribute value to another as overall shortening and lengthening of respective origination and destination entity stacks.

4. The method of claim 3, comprising the additional steps of:
   m. limiting at least one of the one or more entity stacks by a maximum stack height; and
   n. applying a snaking action to grow the at least one or more entity stacks if they exceed the maximum stack height.

5. The method of claim 1, comprising the additional step of:
   j. permitting at least two different sequencing rules for at least one of the plurality of attribute value categories.

6. The method of claim 1, comprising the additional step of:
   j. permitting at least two different sequencing rules for respectively sequencing the separate cell bodies within at least one of the entity stacks.

7. The method of claim 1, comprising the additional step of:
   j. permitting interdependency associations between the separate cell bodies, wherein a change in behavior of at least one cell body can affect a change in behavior in at least one other cell body.

8. The method of claim 1, wherein said movement of the at least one cell body is triggered by human-computer interaction.

9. The method of claim 1, wherein said movement of the at least one cell body is triggered by an external application.

10. The method of claim 1, wherein at least one of said configurations comprises at least one constraint on possible permitted movements of the at least one cell body.

11. The method of claim 1, comprising the additional step of:
    j. activating at least one functional trigger in response to at least one change in at least one attribute value.

12. The method of claim 2 comprising the additional steps of:
    l. designating said lowest level cell bodies as data cells;

m. designating other cell bodies of the separate cell bodies to one or more higher levels of said hierarchical breakdown structure to act as categorical cells;
n. positioning the categorical cells belonging to at least one of the said hierarchical levels either above, below, or beside at least one of said placement indicators;
o. ensuring that each of the cell bodies of the separate cell bodies belonging to at least one of the hierarchical levels comprises identical physical cell components to another cell body of the separate cell bodies belonging to the same hierarchical level;
p. visually aligning each of the separate cell bodies with respect to at least one of the identical physical cell components; and
q. ensuring that the moving of the at least one cell body from its association with the one stack, of the one or more entity stacks, to said another of said entity stacks, occurs either before or after a change in all of the attribute values associated with all of the one or more hierarchical levels associated with the moving.

13. A computer system configured to represent, move, and associate a plurality of entity instances, comprising:
a. at least one computer programmed to perform the following operations:
i. representing each of said plurality of entity instances as a separate cell body comprising a plurality of cell components, wherein a particular cell body is identifiable as representing a particular entity instance of the plurality of entity instances;
ii. ensuring that the plurality of cell components comprise physical, functional and content cell component types;
iii. associating each of said entity instances with at least two attributes;
iv. assigning at least one of the at least two attributes one of at least two possible mutually exclusive attribute values;
v. for each cell component of the plurality of cell components:
1. defining, on a computer, at least one possible attribute to cell component associations;
2. designating, on the computer, one of the possible attribute to cell component associations as a currently active association for the cell component;
3. permitting the cell component to be assigned one of at least two mutually exclusive cell component values;
4. permitting, on the computer, at least one possible input/output value mapping of said attribute value to said cell component value to be assigned for each of said attribute to cell component associations; and
5. permitting, on the computer, a change in at least one attribute value associated with the at least one possible input/output value mapping;
vi. arranging the cell bodies in one or more entity stacks, each stack associated with an attribute value category of a plurality of attribute value categories at an initial time T1, such that each attribute value category is associated with zero or more entity stacks, depending on the presence or absence of cell bodies associated with each said attribute value category at said initial time T1;
vii. using the computer, generating and displaying a configuration representing the plurality of entity instances and their respective attribute values as their separate cell bodies comprising the plurality of cell components and said cell component values respective to said currently active attribute association and the input/output value mapping, wherein the cell bodies are stacked according to said current attribute to category association, wherein the configuration is capable of being switched according to at least one different value mapping, attribute to cell component association, or attribute value category;
viii. moving, using the computer, at least one cell body of said cell bodies from its association with one stack, of the one or more entity stacks, to another of said entity stacks, either before or after a change in the attribute value associated with the entity instance represented by said moved cell body; and
ix. associating patterns, trends, changes or anomalies of at least one attribute value with patterns, trends, changes or anomalies of the separate cell bodies.

14. The computer system of claim 13, the computer further programmed to perform the following additional operations:
x. determining a hierarchical breakdown structure of selected attribute values one or more level deep, wherein each of said one or more levels categorizes the mutually exclusive attribute values, such that a first hierarchical level categorizes a first attribute's values and any deeper levels in the hierarchy sub-categorize values of additional attributes; and
xi. reserving a hierarchical breakdown structure of the cell bodies corresponding to the said breakdown structure of the selected attribute values in order to provide placement indicators for stacking lowest level cell bodies of the separate cell bodies corresponding to their respective attribute values.

15. The computer system of claim 14, the computer further programmed to perform the following additional operation:
xii. closing any gap in the one or more entity stacks resulting from said moving step, thereby representing overall entity instance attribute value changes from one attribute value to another as overall shortening and lengthening of respective origination and destination entity stacks.

16. The computer system of claim 15, the computer further programmed to perform the following additional operation:
xiii. limiting at least one of the one or more entity stacks by a maximum stack height; and
xiv. applying a snaking action to grow the at least one or more entity stacks if they exceed the maximum stack height.

17. The computer system of claim 13, the computer further programmed to perform the following additional operation:
x. permitting at least two different sequencing rules for at least one of the plurality of attribute value categories.

18. The computer system of claim 13, the computer further programmed to perform the following additional operations:
x. permitting at least two different sequencing rules for respectively sequencing the separate cell bodies within at least one of the entity stacks.

19. The computer system of claim 13, the computer further programmed to perform the following additional operation:
x. permitting interdependency associations between the separate cell bodies, wherein a change in behavior of at least one cell body can affect a change in behavior in at least one other cell body.

20. The computer system of claim 13, wherein said movement of the at least one cell body is triggered by human-computer interaction.

21. The computer system of claim 13, wherein said movement of the at least one cell body is triggered by an external application.

22. The computer system of claim 13, wherein at least one of said configurations comprises at least one constraint on possible permitted movements of the at least one cell body.

23. The computer system of claim 13, the computer further programmed to perform the following additional operation:
   x. activating at least one functional trigger in response to at least one change in at least one attribute value.

24. The computer system of claim 14, the computer further programmed to perform the following additional operations:
   xii. designating said lowest level cell bodies as data cells;
   xiii. designating other cell bodies of the separate cell bodies to one or more higher levels of said hierarchical breakdown structure to act as categorical cells;
   xiv. positioning the categorical cells belonging to at least one of the said hierarchical levels either above, below, or beside at least one of said placement indicators;
   xv. ensuring that each of the cell bodies of the separate cell bodies belonging to at least one of the hierarchical levels comprises identical physical cell components to another cell body of the separate cell bodies belonging to the same hierarchical level;
   xvi. visually aligning each of the separate cell bodies with respect to at least one of the identical physical cell components; and
   xvii. ensuring that the moving of the at least one cell body from its association with the one stack, of the one or more entity stacks, to said another of said entity stacks, occurs either before or after a change in all of the attribute values associated with all of the one or more hierarchical levels associated with the moving.

\* \* \* \* \*